United States Patent
Yumiki

(10) Patent No.: US 7,639,300 B2
(45) Date of Patent: Dec. 29, 2009

(54) IMAGING DEVICE, DISPLAY CONTROLLER, AND DISPLAY APPARATUS

(75) Inventor: Naoto Yumiki, Hirakata (JP)

(73) Assignee: Panasonic Corporation, Osaka (JP)

( * ) Notice: Subject to any disclaimer, the term of this patent is extended or adjusted under 35 U.S.C. 154(b) by 592 days.

(21) Appl. No.: 11/264,127

(22) Filed: Nov. 2, 2005

(65) Prior Publication Data

US 2006/0098186 A1      May 11, 2006

(30) Foreign Application Priority Data

Nov. 8, 2004    (JP)    ............................. 2004-323969

(51) Int. Cl.
*H04N 5/222*    (2006.01)

(52) U.S. Cl. ........................... 348/333.12; 348/333.05; 348/333.11; 345/659

(58) Field of Classification Search .............. 348/231.2, 348/231.3, 231.6, 333.05, 333.11, 333.12, 348/207.1, 239, 333.01; 345/649, 656, 658, 345/659
See application file for complete search history.

(56) References Cited

U.S. PATENT DOCUMENTS

| | | | | |
|---|---|---|---|---|
| 5,576,759 | A * | 11/1996 | Kawamura et al. ...... | 348/207.99 |
| 5,973,734 | A * | 10/1999 | Anderson ................... | 348/239 |
| 6,313,877 | B1 * | 11/2001 | Anderson .............. | 348/333.05 |
| 6,453,078 | B2 * | 9/2002 | Bubie et al. ................. | 382/305 |
| 6,674,472 | B1 * | 1/2004 | Tsutsui .................. | 348/333.05 |
| 6,747,690 | B2 * | 6/2004 | Molgaard ................. | 348/208.1 |
| 7,124,359 | B2 * | 10/2006 | Suzuki et al. ............... | 715/202 |
| 2001/0010544 | A1 * | 8/2001 | Wakui ......................... | 348/208 |
| 2001/0048465 | A1 * | 12/2001 | Toyofuku et al. ............ | 348/36 |
| 2002/0024608 | A1 * | 2/2002 | Ejima et al. ............ | 348/333.05 |
| 2002/0028071 | A1 | 3/2002 | Molgaard | |
| 2003/0112357 | A1 * | 6/2003 | Anderson .............. | 348/333.05 |
| 2005/0052570 | A1 * | 3/2005 | Enomoto .................... | 348/375 |

FOREIGN PATENT DOCUMENTS

| | | |
|---|---|---|
| JP | 07-075048 | 3/1995 |
| JP | 2001-045354 | 2/2001 |
| JP | 2002-152568 | 5/2002 |
| JP | 2005-094114 | 4/2005 |

OTHER PUBLICATIONS

Chinese Office Action issued in Chinese Patent Application No. CN 200510124696X dated Apr. 24, 2009.

* cited by examiner

*Primary Examiner*—Lin Ye
*Assistant Examiner*—Chriss S Yoder, III
(74) *Attorney, Agent, or Firm*—McDermott Will & Emery LLP

(57) ABSTRACT

An imaging device includes a display unit for displaying an image, an imaging optical system, an imaging unit, a posture detector for detecting a posture of the imaging device in shooting, a recording unit for recording a reduced image of a shot image, and posture information on a posture of the imaging device corresponding to the reduced image, an image extracting unit for extracting reduced images including the same posture information among said reduced images recorded on the recording unit, and an image display controller for displaying the reduced images extracted by the image extracting unit on the display unit, wherein the image display controller reconstructs, on the basis of the posture information, a horizontal and vertical direction of the reduced images extracted by the image extracting unit to the posture of the imaging device in shooting, and displays the reduced image being reconstructed on the display unit. Thereby, that makes it possible to display a comfortable reduced image.

16 Claims, 19 Drawing Sheets

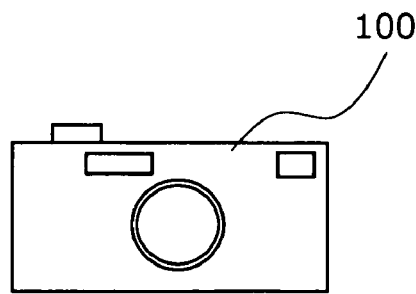
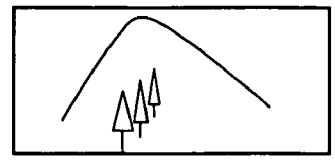
FIG.18A PRIOR ART
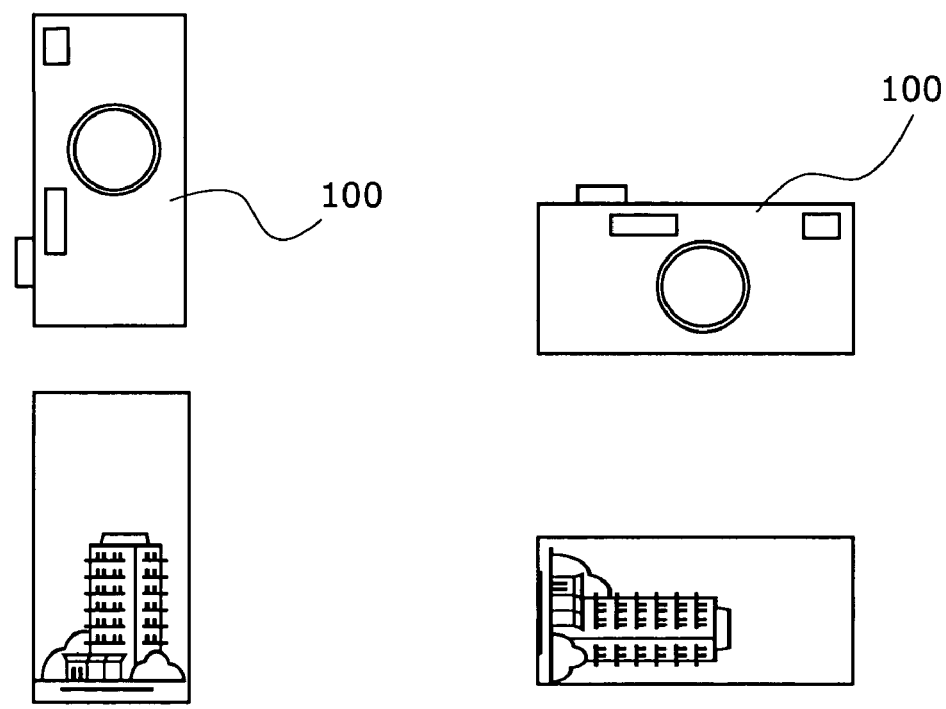
FIG.18B PRIOR ART           FIG.18C PRIOR ART

IMAGING DEVICE, DISPLAY CONTROLLER, AND DISPLAY APPARATUS

BACKGROUND OF THE INVENTION

1. Field of the Invention

The present invention relates to a method of displaying an image taken by an imaging device, and relates more specifically to an imaging device, a display controller, and a display apparatus, capable of controlling a method of displaying the shot images on the basis of posture information of the imaging device.

2. Description of the Background Art

In recent years, integration density of an image sensor, such as a CCD (Charge Coupled Device) and a CMOS (Complementary Metal-Oxide Semiconductor), and signal processing used for it has been increased, and the CCD and the CMOS have been able to be provided at low cost, so that a digital still camera and a digital video camera (hereinafter, referred merely to as digital camera) capable of converting an optical image of a subject into an electrical image signal to be outputted therefrom have rapidly come into widespread use.

FIGS. 18A through 18C are views showing a relationship between a posture of a digital camera and a posture of a shot image displayed on a display section. As shown in FIGS. 18A through 18C, a user shoots a subject by changing the posture of the digital camera 100 according to a shooting purpose. For example, in shooting a landscape subject, such as scenery, the user shoots the image by setting the posture of the digital camera 100 in a horizontal state, while in shooting a portrait subject, such as a person, a building or the like, the user shoots by setting the posture of the digital camera 100 in a vertical state. Hereinafter, as shown in FIG. 18A, a posture of the digital camera 100 when a stroke direction of a shutter button is in parallel to a gravity direction will be referred to a horizontally framed shooting posture, while as shown in FIG. 18B, a posture of the digital camera 100 when the stroke direction of the shutter button perpendicular to the gravity direction will be referred to a vertically framed shooting posture. Additionally, images taken in respective postures will be referred to a horizontally framed image or a vertically framed image. In the conventional digital camera 100, the shot image has been displayed in the same direction as the posture of the digital camera 100 in shooting. In other words, when the image taken in the vertically framed shooting posture as shown in FIG. 18B is displayed on the display section while setting the digital camera 100 in the horizontal state as shown in FIG. 18C, a horizontal and vertical direction of the shot image to be displayed will be displayed differently from a horizontal and vertical direction in shooting. Accordingly, at the time of displaying a series of shot images in which the vertically framed images and the horizontally framed images are mixedly present, there has been a problem of a difficulty in visibility because the horizontal and vertical direction of the vertically framed image has been different from that the image in shooting.

In order to solve this problem, Japanese Unexamined Patent Publication (Kokai) No. 2001-45354 (hereinafter, referred to as Patent Document 1) proposes a technology to provide a rotation state detection unit for detecting a rotation state of a photoelectric converter, and an addition unit for adding rotation state information in shooting to image information obtained on the basis of an output of the photoelectric converter, to an imaging device.

Adding the rotation state information to the shot image signal makes it possible to detect the shooting posture of the digital camera in shooting, and display the image corresponding to the posture in shooting, irrespective of the image taken in the horizontally framed shooting posture or in the vertically framed shooting posture.

In the case of displaying a plurality of images taken by the user, there is provided a method of displaying the shot images in a list form on a display section 200 provided in the digital camera. In order to display the images in a list form, each shot image is reduced in size and then displayed thereon. Hereinafter, displaying a plurality of images on the display section in a list form will be referred to as a thumbnail display, while an image that is reduced for the purpose of being displayed in a list form will be referred to thumbnail image. In addition, the thumbnail image of the image taken in the horizontally framed shooting posture will be referred to as a horizontally framed thumbnail image, and the thumbnail image of the image taken in the vertically framed shooting posture will be referred to as a vertically framed thumbnail image.

As shown in FIG. 19, according to an invention described in Patent Document 1, when the shot images are displayed in the thumbnail form, the images can be displayed corresponding to the postures in shooting, irrespective of the horizontally framed image or the vertically framed image. The vertically framed thumbnail image displayed on the display section 200, however, is narrower in the range displayed in a horizontal direction compared with the horizontally framed thumbnail image, and cannot be displayed in an enlarged image form. As a result of that, the vertically framed thumbnail image displayed on the display section 200 has been smaller in size compared with the horizontally framed thumbnail image, so that there has been a problem that the image has been hard for the user to see, resulting in a difficulty in visibility.

SUMMARY OF THE INVENTION

It is an object of the present invention to provide an imaging device allowing a comfortable reduced image display irrespective of shooting postures by performing a display corresponding to a posture of the imaging device in shooting when a shot image is displayed in a reduced image, and further a display controller and a display apparatus enabling to achieve it.

The object of the present invention can be achieved by an imaging device provided with a following configuration. An imaging device for producing an electrical image signal obtained by converting an optical image of a subject includes a display unit for displaying an image on the basis of the image signal, an imaging optical system for forming the optical image of the subject, an imaging unit for receiving the optical image formed by the imaging optical system to convert the optical image into the electrical image signal, a posture detector for detecting a posture of the imaging device in shooting, a recording unit for recording a reduced image of the shot image obtained by the imaging unit, and posture information on the posture of the imaging device, the posture being detected by the posture detector and corresponding to the reduced image, an image extracting unit for extracting reduced images including the same posture information among the reduced images recorded on the recording unit, and an image display controller for displaying the reduced images extracted by the image extracting unit on the display unit, wherein the image display controller reconstructs, on the basis of the posture information, a horizontal and vertical direction of the reduced images extracted by the image extracting unit to the posture of the imaging device in shooting, and displays the reduced image being reconstructed on the display unit.

According to this configuration, the shot images are extracted according to the posture of the imaging device, and the horizontal and vertical direction of the image taken in the vertically framed shooting posture is reconstructed to the posture of the imaging device in shooting to be displayed on the display section, thereby making it possible to provide a comfortable reduced image display.

The object of the present invention can be achieved by an imaging device provided with a following configuration. An imaging device that produces an electrical image signal obtained by converting an optical image of a subject, and is connectable to a display unit includes an imaging optical system for forming the optical image of the subject, an imaging unit for receiving the optical image formed by the imaging optical system to convert the optical image into the electrical image signal, a posture detector for detecting a posture of the imaging device in shooting, a recording unit for recording a reduced image of the shot image obtained by the imaging unit, and posture information on the posture of the imaging device, the posture being detected by the posture detector and corresponding to the reduced image, an image extracting unit for extracting the reduced images on the basis of the posture information, an image display controller for generating a control signal to control the display of the reduced images extracted by the image extracting unit, and an output unit for supplying the control signal and the reduced image to the display unit, wherein the control signal reconstructs, on the basis of the posture information, a horizontal and vertical direction of the reduced images extracted by the image extracting unit to the posture of the imaging device in shooting, and includes a signal to display the reduced image being reconstructed on the display unit.

According to this configuration, the shot images are extracted according to the posture of the imaging device, and the horizontal and vertical direction of the image taken in the vertically framed shooting posture is reconstructed to the posture of the imaging device in shooting to be displayed on the display section, thereby making it possible to provide a comfortable reduced image display.

Further, the object of the present invention is achieved by a display apparatus provided with a following configuration. A display apparatus for reading a reduced image of a shot image, and posture information on a posture of an imaging device corresponding to the reduced image recorded on a recording unit to thereby display the reduced image includes a read unit for reading the reduced image, and the posture information corresponding to the reduced image recorded on a recording unit, an image extracting unit for extracting reduced images including the same posture information among the reduced images read by the read unit, and an image display controller for displaying the reduced images extracted by the image extracting unit on the display unit, wherein the image display controller reconstructs, on the basis of the posture information, a horizontal and vertical direction of the reduced images extracted by the image extracting unit to the posture of the imaging device in shooting, and displays the reduced image being reconstructed on the display unit.

According to this configuration, the shot images are extracted according to the posture of the imaging device, and the horizontal and vertical direction of the image taken in the vertically framed shooting posture is reconstructed to the posture of the imaging device in shooting to be displayed on the display unit, thereby making it possible to provide the display apparatus allowing a comfortable reduced image display.

Still further, the object of the present invention is achieved by a display controller provided with a following configuration. A display controller connectable to a display unit includes a read unit for reading a reduced image of a shot image, and posture information on a posture of an imaging device corresponding to the reduced image recorded on a recording unit, an image extracting unit for extracting reduced images including the same posture information among the reduced images read by the read unit, an image display controller for generating a control signal to control the display of the reduced images extracted by the image extracting unit, and an output unit for supplying the control signal and the reduced image to the display unit, wherein the control signal reconstructs, on the basis of the posture information, a horizontal and vertical direction of the reduced images extracted by the image extracting unit to the posture of the imaging device in shooting, and includes a signal to display the reduced image being reconstructed on the display unit.

According to this configuration, the image display controller generates the control signal for displaying the reduced image obtained by reconstructing the horizontal and vertical direction of the image taken in the vertically framed shooting posture to the posture of the imaging device in shooting. In addition, the output unit outputs the control signal and the reduced image to the externally connected the display apparatus, thereby making it possible to display a comfortable reduced image on the externally connected the display apparatus.

Still further, the object of the present invention is achieved by a display controller provided with a following configuration. A display controller connectable to a read unit for reading a reduced image of a shot image, and posture information on a posture of an imaging device corresponding to the reduced image recorded on a recording unit, and a display unit includes an image extracting unit for extracting reduced images including the same posture information among the reduced images read by the read unit, an image display controller for generating a control signal to control the display of the reduced images extracted by the image extracting unit, and an output unit for supplying the control signal and the reduced image to the display unit, wherein the control signal reconstructs, on the basis of the posture information, a horizontal and vertical direction of the reduced images extracted by the image extracting unit to the posture of the imaging device in shooting, and includes a signal to display the reduced image being reconstructed on the display unit.

According to this configuration, the image display controller generates the control signal for displaying the reduced image obtained by reconstructing the horizontal and vertical direction of the image taken in the vertically framed shooting posture to the posture of the imaging device in shooting, thereby making it possible to display a comfortable reduced image on the display apparatus connected to the display controller.

According to the present invention, it is therefore possible to provide the imaging device allowing a comfortable reduced image display irrespective of the shooting posture by performing the display according to the posture of the imaging device in shooting when the shot image is displayed in the reduced image, and further the display controller and the display apparatus to achieve it.

These and other objects, features, aspects, and advantages of the present invention will become more apparent from the following detailed description of the present invention when taken in conjunction with the accompanying drawings.

BRIEF DESCRIPTION OF THE DRAWINGS

FIG. 18A is a view showing the relationship between the posture of the digital camera and the posture of the shot image displayed on the display section;

FIG. 18B is a view showing the relationship between the posture of the digital camera and the posture of the shot image displayed on the display section;

FIG. 18C is a view showing the relationship between the posture of the digital camera and the posture of the shot image displayed on the display section.

DETAILED DESCRIPTION OF THE PREFERRED EMBODIMENTS

First Embodiment

Figure 1:
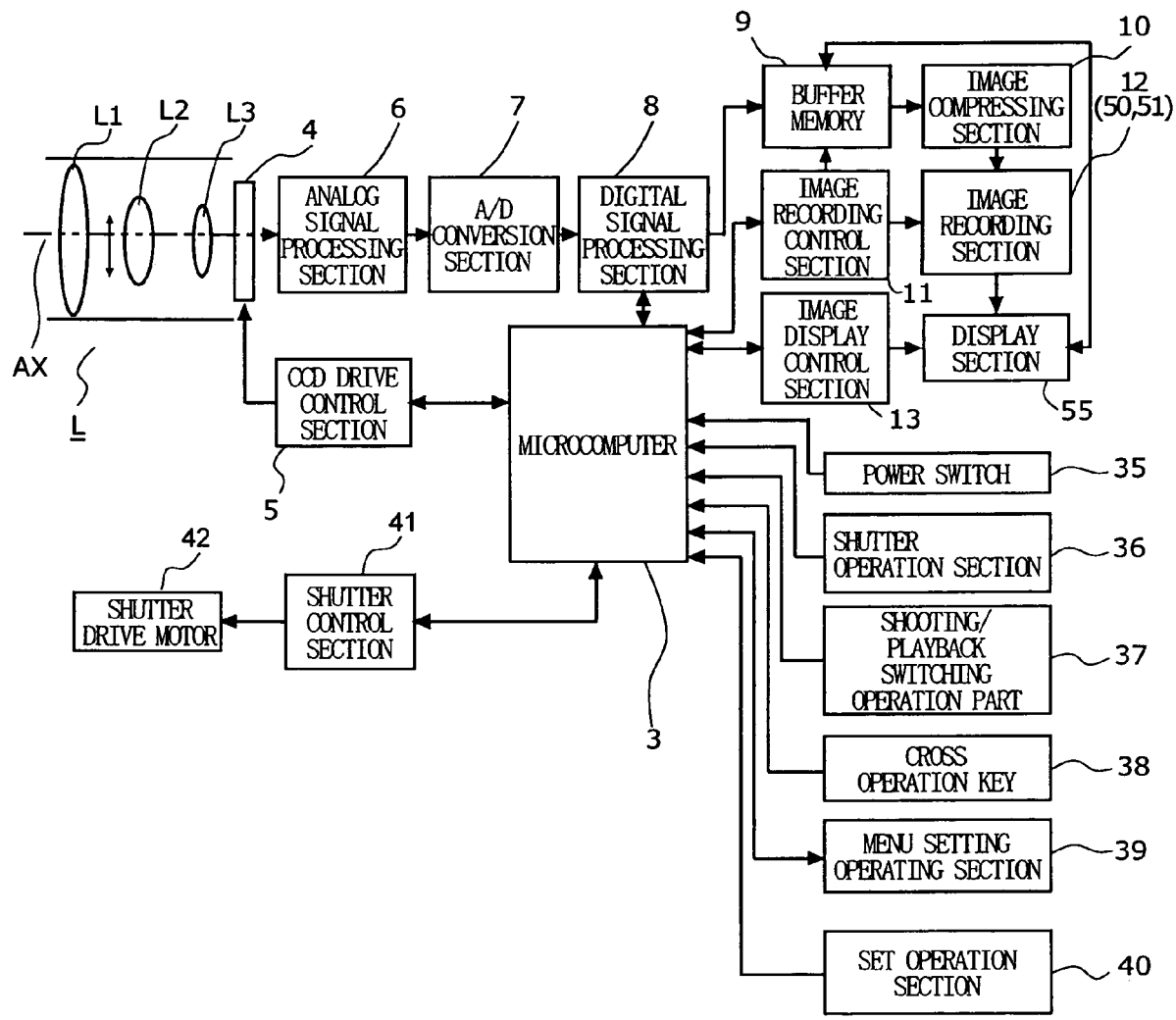
FIG. 1 is a block diagram showing a control system of a digital camera according to a first embodiment.

FIG. 1 is a block diagram showing a schematic configuration of a digital camera 1 according to a first embodiment of the present invention. In FIG. 1, the digital camera 1 includes an imaging optical system L, a microcomputer 3, an image sensor 4, a CCD drive control section 5, an analog signal processing section 6, an A/D conversion section 7, a digital signal processing section 8, a buffer memory 9, an image compressing section 10, an image recording control section 11, an image recording section 12, an image display control section 13, a display section 55, a shutter control section 41, and a shutter drive motor 42.

The imaging optical system L is an optical system including three lens units L1, L2, and L3, in which the first lens unit L1 performs focusing by moving along direction of optical axis, and the third lens unit L3 performs zooming by moving along the direction of the optical axis. Meanwhile, the second lens unit L2 is a compensation lens unit, and serves to compensate a motion of the image by moving inside a plane perpendicular to the optical axis to thereby shift the center of the optical axis.

When a mechanical vibration, a shake by a user, or the like is applied to the digital camera 1, an optical axis of a light to contribute for forming a subject image among lights irradiated from the subject toward the lens will be shifted from the optical axis of the lens. Accordingly, the resultant image will result in an unclear image. A prevention mechanism for preventing this will be called an image blur compensation mechanism in the following. Moreover, in this embodiment, the image blur compensation mechanism may also be used as a posture detector of the digital camera 1. Incidentally, these structure and operation will be described later.

The microcomputer 3 entirely controls various control sections of the digital camera 1. In addition, the microcomputer 3 can receive signals from a power switch 35, a shutter operation section 36, a shooting/playback switching operation section 37, a cross operation key 38, a MENU setting operation section 39 and a SET operation section 40, respectively.

With a timing signal generated by the operation of the shutter operation section 36, on the basis of a control signal from the microcomputer 3, the shutter control section 41 drives the shutter drive motor 42 to operate a shutter.

The image sensor 4 is composed of a CCD and converts an optical image formed by the imaging optical system L into an electrical signal. The image sensor 4 is driven and controlled by the CCD drive control section 5. Incidentally, the image sensor 4 may be composed of a CMOS device.

An image signal outputted from the image sensor 4 is sequentially sent from the analog signal processing section 6, through the A/D conversion section 7, the digital signal processing section 8, the buffer memory 9, to the image compressing section 10 to be processed. The analog signal processing section 6 performs analog signal processing, such as gamma processing or the like to the image signal outputted from the image sensor 4. The A/D conversion section 7 converts an analog signal outputted from the analog signal processing section 6 into a digital signal. The digital signal processing section 8 performs digital signal processing, such as noise rejection, edge enhancement, or the like to the image signal converted into the digital signal by the A/D conversion section 7. The buffer memory 9 is composed of RAM (Random Access Memory) and temporarily stores the image signal processed by the digital signal processing section 8.

Further, the image signal stored in the buffer memory 9 is sequentially sent from the image compressing section 10 to the image recording section 12 to be processed. The image signal stored in the buffer memory 9 is read by an instruction of the image recording control section 11, and sent to the image compressing section 10, so that data of the image signal is compressed to a predetermined size therein. In this case, the image signal is compressed at a predetermined ratio, so that the data size is reduced. As this compression method, for example JPEG (Joint Photographic Experts Group) format may be used. At the same time, the image compressing section 10 also generates a reduced image signal corresponding to a shot image, which is used for a thumbnail display or the like. Subsequently, the image signal being compressed and the reduced image signal are sent to the image recording section 12.

The image recording section 12 is composed of an internal memory 50 provided to a body of the digital camera 1, and/or a removable memory 51 being attachable and detachable thereto, and on the basis of the instruction of the image recording control section 11, associatingly records the image signal, a corresponding reduced image signal, and predetermined information. The predetermined information, which should be recorded with these image signals, includes the date and time in shooting, focal distance information, shutter speed information, aperture value information, shooting mode information, and posture information of the digital camera 1, which will be described later.

The image display control section 13 is controlled by a control signal from the microcomputer 3. According to an instruction of this image display control section 13, the display section 55 displays the image signal recorded on the image recording section 12 or the buffer memory 9 as a visible image. As for display forms of the display section 55, there are two display forms, one is to display only the image signal, and the other is to display the information of the image signal in shooting. The information of the image signal in shooting includes focal distance information, shutter speed information, aperture value information, shooting mode information, on-focal state information, and posture information. Such information is displayed by the operation of the MENU setting operation section 39.

Figure 2A:
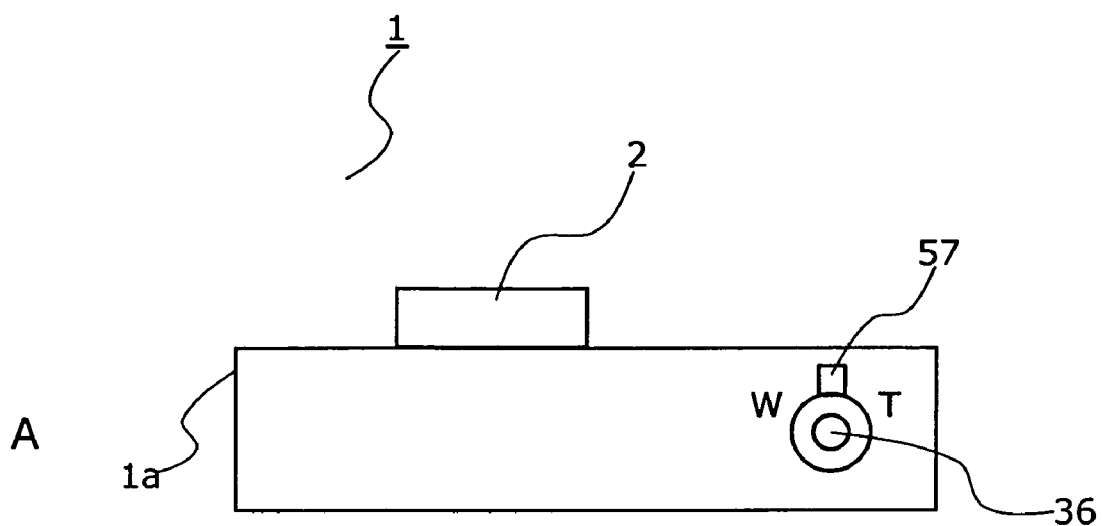
FIG. 2A is a top view of the digital camera according to the first embodiment.
Figure 2B:
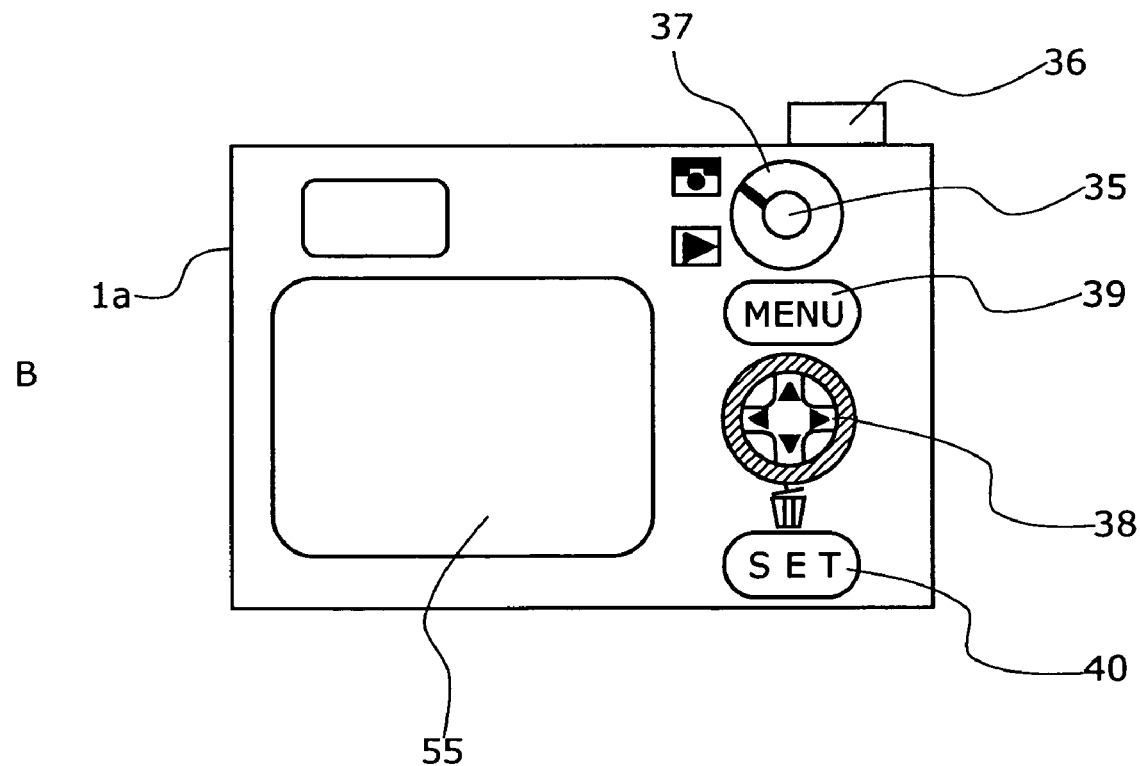
FIG. 2B is a rear view of the digital camera according to the first embodiment.

Next, a configuration of the digital camera 1 according to the first embodiment will be explained with reference to FIGS. 2A and 2B. FIG. 2A is a top view of the digital camera 1, and FIG. 2B is a rear view of the digital camera 1.

A housing 1a is provided with the imaging optical system including a lens 2 on the front side, and includes, on the back side, the power switch 35, the shooting/playback switching operation section 37, the cross operation key 38, the MENU setting operation section 39, the SET operation section 40, and the display section 55 that is composed of an LCD monitor. The housing 1a is further provided with the shutter operation section 36 and a zoom operation section 57 on the top.

The zoom operation section 57 is provided around the shutter operation section 36, so that it may be coaxially rotatable with the shutter operation section 36. The power switch 35 is an operating member for turning on/off the power of the digital camera 1. The shooting/playback switching operation section 37 is an operating member for switching a shooting mode and a playback mode, and achieves the switching by rotating a lever. The imaging optical system L is controlled by the microcomputer 3, so that, in the state of being switched to the shooting mode, when the zoom operation section 57 is rotated to the right and to the left, it maybe switched to a telephoto side and a wide-angle side, respectively. The MENU setting operation section 39 is an operating member for displaying various menus on the display section 55. The cross operation key 38 is an operating member for selecting a desired operation menu, by pressing a portion at four sides, from the various operation menus displayed on the display section 55 by the operation of the MENU setting operation section 39. When various operation menus are selected by the cross operation key 38, the microcomputer 3 will instruct to execute the selected menus. The SET operation section 40 is an operating member for returning the display of various operation menus to the previous state of the display.

Figure 3:
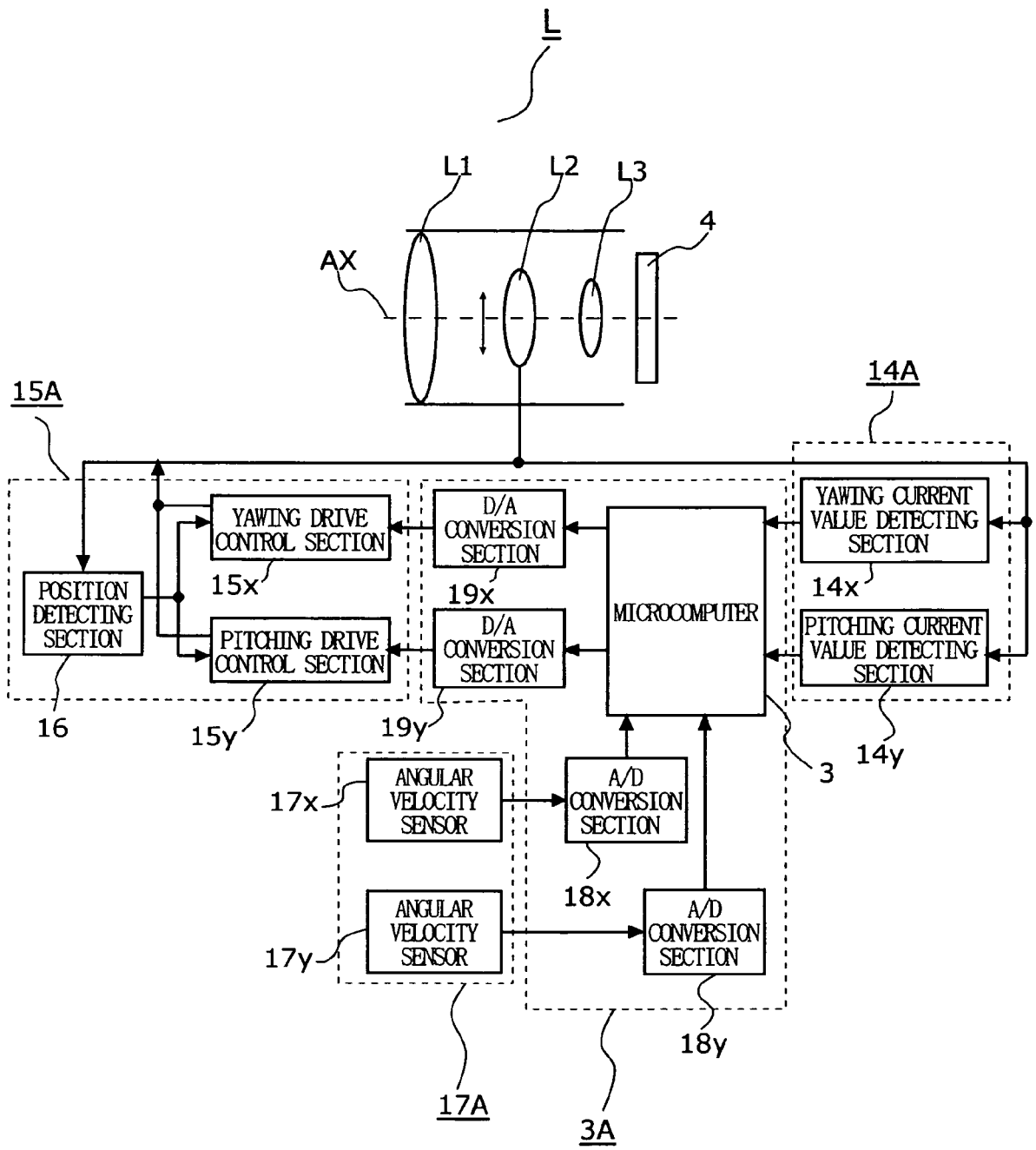
FIG. 3 is a block diagram showing a hardware configuration of an image blur compensation mechanism according to the first embodiment.

Next, a control system of the image blur compensation mechanism will be explained with reference to FIG. 3. In FIG. 3, the image blur compensation mechanism includes a motion compensation section 15A, a shooting posture detecting section 14A, a motion detector 17A, and a signal processing section 3A. The motion compensation section 15A for controlling the optical axis of an image shooting light includes the second lens unit L2, a yawing control section 15x, a pitching control section 15y, and a position detecting section 16. The second lens unit L2 is the compensation lens unit, which serves to compensate the motion of the image by moving inside the plane perpendicular to the optical axis to thereby shift the center of the optical axis. The second lens unit L2 is controllably driven by the yawing drive control section 15x and the pitching drive control section 15y in two directions, namely an X direction and a Y direction, perpendicular to the optical axis AX. Hereinafter, the X direction is defined as a yawing direction, and the Y direction is defined as a pitching direction. The position detecting section 16 is a detector for detecting a position of the second lens unit L2, and forms a feedback control loop for controlling the second lens unit L2 with the yawing drive control section 15x and the pitching drive control section 15y.

The shooting posture detecting section 14A includes a yawing current value detecting section 14x and a pitching current value detecting section 14y. The yawing current value detecting section 14x detects a value of a current flowing through a coil, when a yawing actuator 29x, which will be described later, is operated. Similarly, the pitching current value detecting section 14y detects a value of a current flowing through a coil, when a pitching actuator 29y is operated.

The motion detector 17A includes a yawing angular velocity sensor 17x and a pitching angular velocity sensor 17y. The angular velocity sensors 17x and 17y are sensors for detecting a motion of the imaging device itself including the imaging optical system L due to a hand blur and other vibrations, and detect motions in two directions, namely the yawing and pitching directions, respectively. The angular velocity sensors 17x and 17y output either of positive/negative angular velocity signals according to a direction to which the digital camera 1 moves with reference to an output provided when the digital camera 1 remains at rest. The outputted signal is processed in the signal processing section.

The signal processing section 3A includes the microcomputer 3, A/D conversion sections 18x and 18y, and D/A conversion sections 19x and 19y. The signals outputted from the angular velocity sensors 17x and 17y, after filter processing, amplifier processing, and the like are performed, are converted into digital signals by the A/D conversion sections 18x and 18y, respectively, to be then supplied to the microcomputer 3. The microcomputer 3 performs respective processings, such as filtering, integral processing, phase compensation, gain adjustment, clip processing, and the like to the output signals provided from the angular velocity sensors 17x and 17y via the A/D conversion sections 18x and 18y. By performing each of these processings, the microcomputer 3 calculates a controlled variable for driving the compensation lens unit L2 required for a motion compensation to thereby generate control signals. The generated control signals are outputted to the yawing drive control section 15x and the pitching drive control section 15y via the D/A conversion sections 19x and 19y. As a result, on the basis of the control signals, the yawing drive control section 15x and the pitching drive control section 15y drive the compensation lens unit L2 to thereby compensate the motion of the image.

Figure 4:
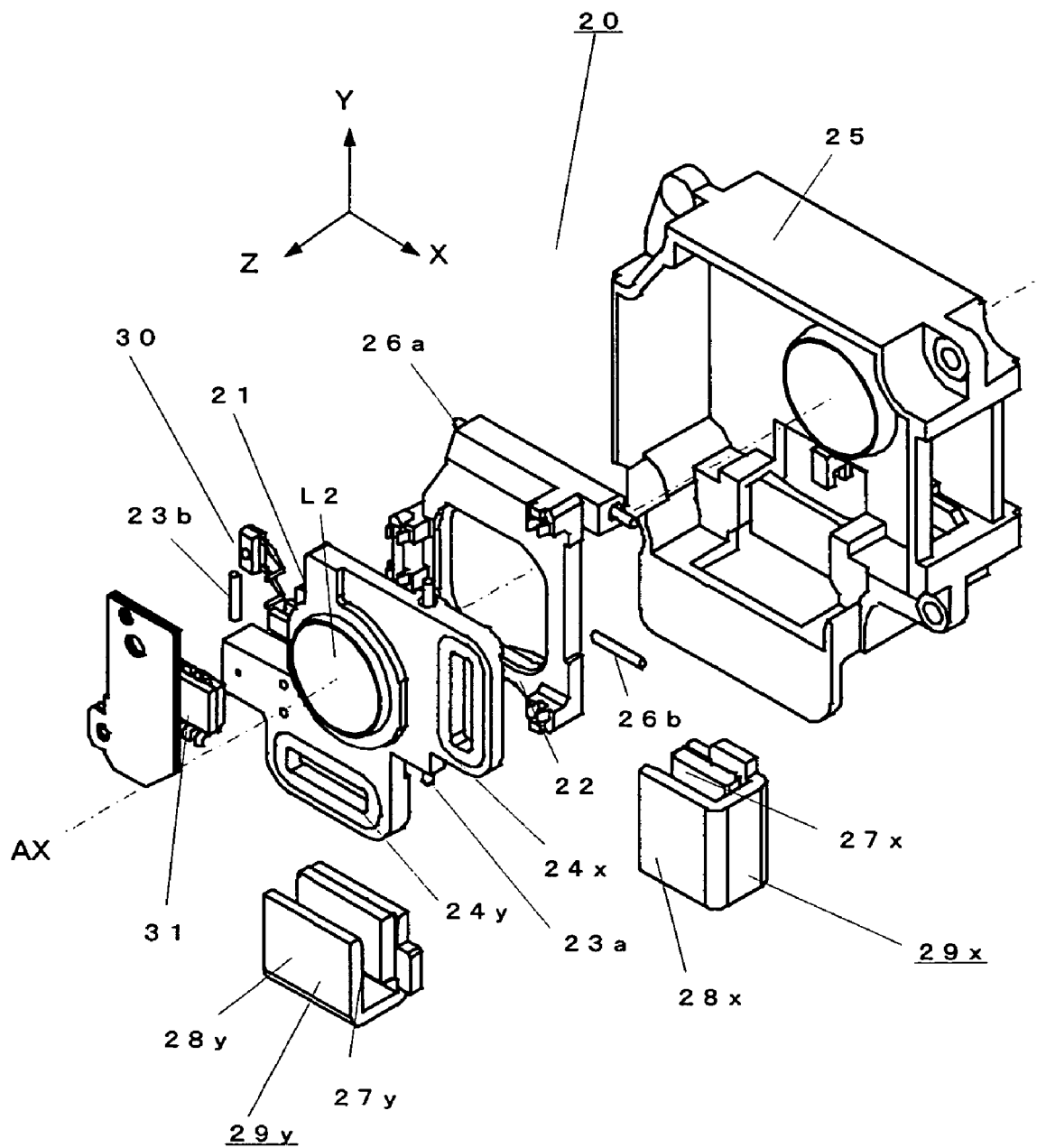
FIG. 4 is an exploded perspective view of the image blur compensation mechanism according to the first embodiment.

Next, a configuration of the image blur compensation mechanism 20 used for this embodiment will be explained with reference to FIG. 4. In FIG. 4, the image blur compensation mechanism 20 includes a pitching holding frame 21, a yawing holding frame 22, a fixed frame 25, an actuator 29x for yawing, an actuator 29y for pitching, a light emitting device 30, and a photo detector 31.

The pitching holding frame 21 has coils 24x and 24y. The second lens unit L2 and the light emitting device 30 are fixed to the pitching holding frame 21. The pitching holding frame 21 is slidably held to the yawing holding frame 22 via two pitching shafts 23a and 23b in the Y direction.

The yawing holding frame 22 is slidably held to the fixed frame 25 via yawing shafts 26a and 26b in the X direction.

The actuator 29x for yawing has a magnet 27x and a yoke 28x, and is held to the fixed frame 25. Similarly, the pitching actuator 29y has a magnet 27y and a yoke 28y, and is held to the fixed frame 25.

The photo detector 31 is fixed to the fixed frame 25, receives a light emitted from the light emitting device 30, and detects two-dimensional position coordinates.

Figure 5A:
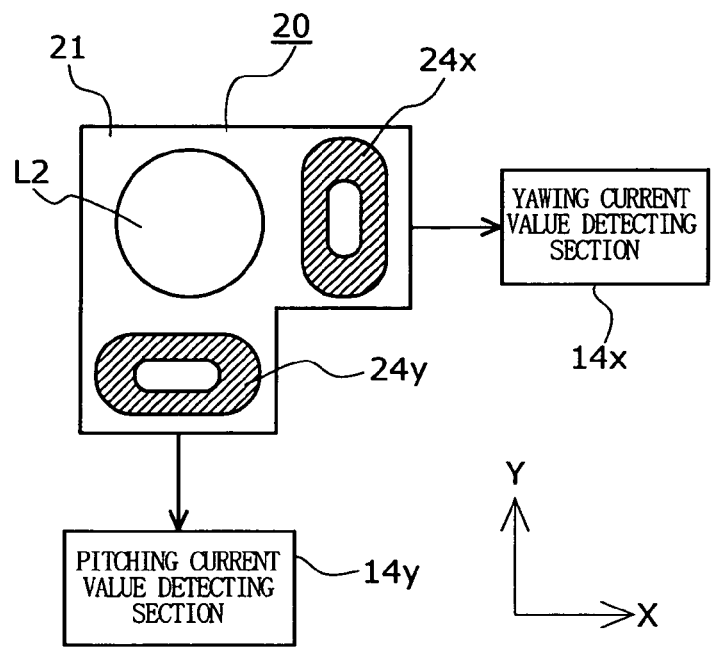
FIG. 5A is a view showing a posture of the image blur compensation mechanism according to the first embodiment.
Figure 5B:
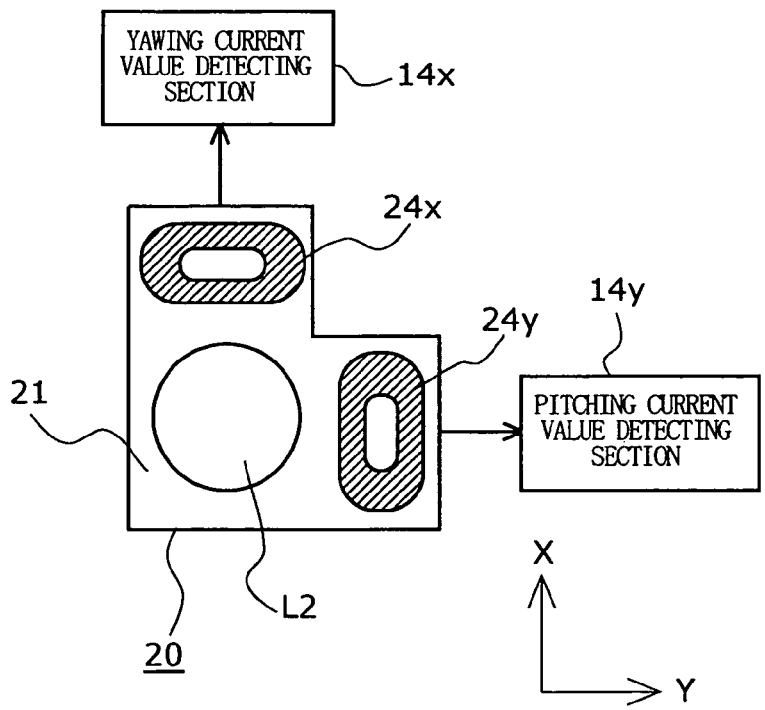
FIG. 5B is a view showing the posture of the image blur compensation mechanism according to the first embodiment.
Figure 6:
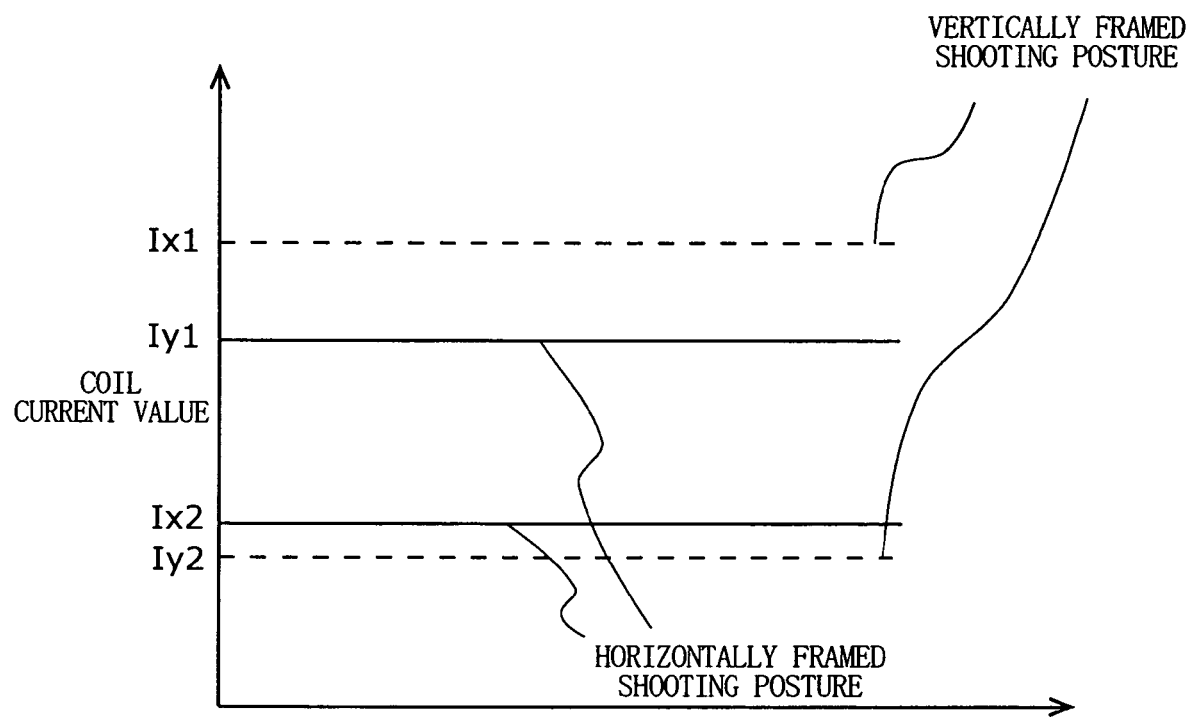
FIG. 6 is a graph showing an amount of current supplied to a coil by shooting posture according to the first embodiment.

Next, a current value detecting manner using the yawing current value detecting section 14x and the pitching current value detecting section 14y will be explained with reference to FIG. 5 and FIG. 6. FIGS. 5A and 5B illustrates postures of the image blur compensation mechanism 20, in which FIG. 5A illustrates the posture of the image blur compensation mechanism 20 in the shooting of the horizontally framed shooting posture, while FIG. 5B illustrates the posture of the image blur compensation mechanism 20 in the shooting of the vertically framed shooting posture.

In FIG. 5A, in the case of the horizontally framed shooting posture, respective weights of the second lens unit L2, the pitching holding frame 21, the coils 24x and 24y, and the yawing holding frame 22 act in the Y direction which is a gravity direction. At this time, in order to obtain an appropriate image, the second lens unit L2 needs to be held in the center of the optical axis. For that reason, the electromagnetic force for supporting the same weight as a self weight of the second lens unit L2 needs to be generated. Accordingly, in order to generate the required electromagnetic force, a current Iy1 is supplied to the coil 24y. Meanwhile, as for the X direction, since it is not necessary to take into consideration the same weight as the self weight for holding the second lens unit L2 in the center of the optical axis, a value of a current Ix2 supplied to the coil 24x will result in a small value as compared with that of the current Iy1 supplied to the coil 24y.

FIG. 5B illustrates the posture of the image blur compensation mechanism 20 in the vertically framed shooting posture, which is provided by rotating by 90 degrees the horizontally framed shooting posture about the optical axis. The respective weights of the second lens unit L2, the pitching holding frame 21, the coils 24x and 24y, and the yawing holding frame 22 act in the X direction which is the gravity direction. At this time, the second lens unit L2 needs to be held in the center of the optical axis. For that reason, as for the X direction, in addition to the same weight as the self weight of the second lens unit L2, generating the electromagnetic force for supporting the same weight as a self weight of the yawing holding frame 22 is required. Accordingly, in order to generate the required electromagnetic force, a current Ix1 is supplied to the coil 24x. When the same weight as the self weight of the yawing holding frame 22 is taken into consideration, a value of the current Ix1 will result in a large value as compared with that of the current Iy1 supplied to the coil 24y in the horizontally framed shooting posture. Meanwhile, as for the Y direction, since it is not necessary to take into consideration the same weight as the self weight for holding the second lens unit L2 in the center of the optical axis, a value of a current Iy2 supplied to the coil 24y will result in a small value as compared with that of the current Ix1 supplied to the coil 24x.

As mentioned above, the values of the currents flowing through the coils 24x and 24y will be determined by the shooting postures of the digital camera 1. In other words, the shooting posture of the image blur compensation mechanism 20 and the digital camera 1 is determined by detecting the values of the currents flowing through the coils. Accordingly, the image blur compensation mechanism 20 can also be used as the posture detector of the digital camera 1, while serving to prevent the image blur.

Figure 7:
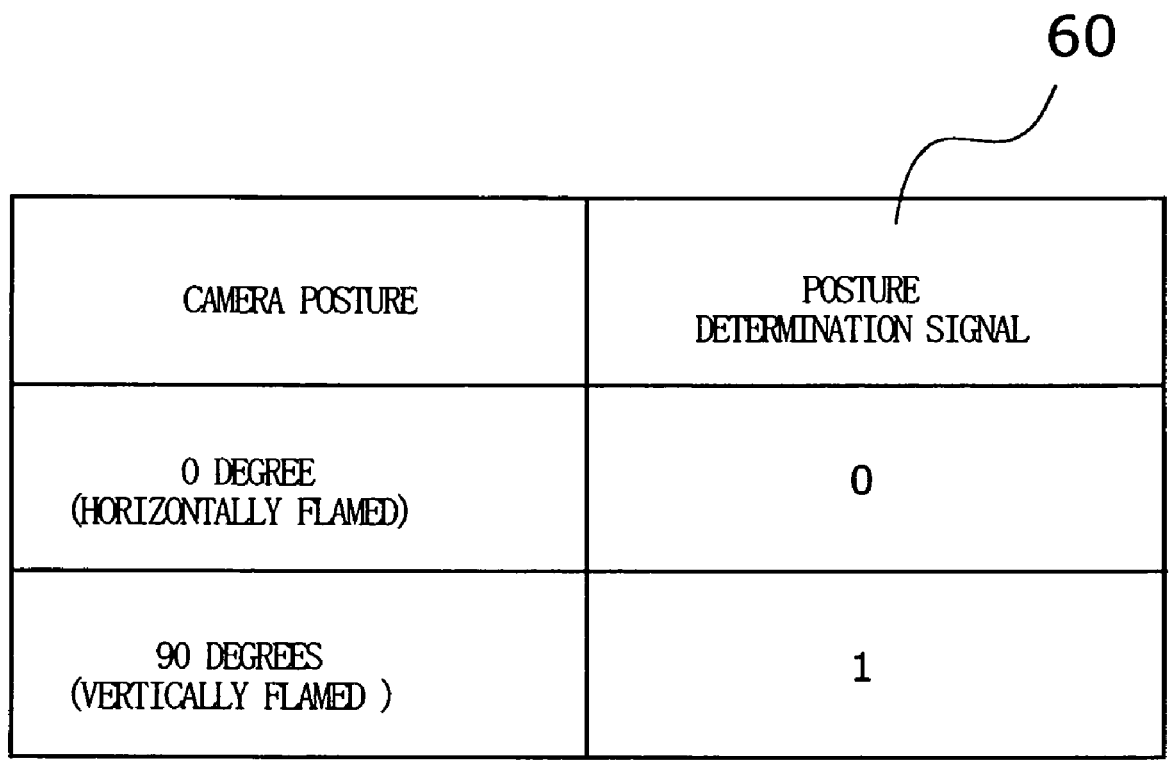
FIG. 7 is a table showing a posture determination signal by shooting posture according to the first embodiment.

Next, operation of the digital camera 1 according to this embodiment will be explained with reference to FIGS. 1 through 7. FIG. 6 is a graph showing an amount of the current supplied to the coil by shooting posture, while FIG. 7 is a table showing posture determination signals by shooting posture. When shooting, a user first sets the power switch 35 to an ON-side to then switch the shooting/playback switching operation section 37 to the shooting mode. As a result of this, the digital camera 1 is moved to a shooting state. Once it is moved to the shooting state, the hand blur and the vibration applied to the digital camera 1 are detected by the angular velocity sensors 17x and 17y. The microcomputer 3 sends command signals for canceling the generated hand blur or the like to the yawing drive control section 15x and the pitching drive control section 15y. A current according to this command signal is supplied to each of the coils 24x and 24y of the pitching holding frame 21. The pitching holding frame 21 is moved by a magnetic circuit formed of the supplied current and the magnets 27x and 27y inside a plane formed by the two directions, namely the X direction and the Y direction, perpendicular to the optical axis AX. Meanwhile, a position of the pitching holding frame 21 is highly accurately detected by using the photo detector 31. That is, the second lens unit L2 is moved by the image blur compensation mechanism 20 inside the plane formed by two directions perpendicular to the optical axis. As a result of this, the user can compensate the image inputted to the image sensor 4 via the imaging optical system L, thereby making it possible to shoot an excellent image with a reduced image blur.

Meanwhile, the determination of the shooting posture of the digital camera 1 is made as follows. Here, the posture of the digital camera 1 in the horizontally framed shooting posture is used as a reference, and an angle in that case is defined as 0 degree. Meanwhile, the posture of the digital camera 1 in the vertically framed shooting posture will be given by rotating by 90 degrees the horizontally framed shooting posture about the optical axis.

A case for the user to shoot an image of a landscape subject, such as scenery, in the horizontally framed shooting posture will be explained. The posture of the digital camera 1 is determined by the value of the current detected by the yawing current value detecting section 14$x$ and the pitching current value detecting section 14$y$. In FIG. 6, when the image is shot in the horizontally framed shooting posture, namely a posture at 0 degree, by the yawing current value detecting section 14$x$ and the pitching current value detecting section 14$y$, the value of the current $Ix2$ flowing through the coil 24$x$ and the value of the current $Iy1$ flowing through the coil 24$y$ of the image blur compensation mechanism 20 are detected, respectively. On the basis of these values of the currents, the microcomputer 3 can determine that the posture of the digital camera 1 is in the horizontally framed shooting posture. In this state, by pressing the shutter operation section 36, the user can shoot the image of the subject. The shot image is then recorded on the image recording section 12. In this case, as shown in FIG. 7, the image recording control section 11 adds a posture determination signal 60 (0) for indicating that the shooting posture of the digital camera 1 has been 0 degree to the image signal outputted from the buffer memory 9. This posture determination signal 60 is recorded on, for example a header or footer portion of the image signal. Incidentally, a location for recording the posture determination signal 60 may be either of the buffer memory 9 and the image recording section 12.

Meanwhile, when the user shoots an image of a portrait subject, such as person, in the vertically framed shooting posture, in a manner similar to that in the horizontally framed shooting posture, the posture of the digital camera 1 is determined by the values of the currents detected by the yawing current value detecting section 14$x$ and the pitching current value detecting section 14$y$. In FIG. 6, when the user shoots in the vertically framed shooting posture, namely a posture at 90 degrees, by the yawing current value detecting section 14$x$ and the pitching current value detecting section 14$y$, the value of the current $Ix1$ flowing through the coil 24$x$ and the value of the current $Iy2$ flowing through the coil 24$y$ of the image blur compensation mechanism 20 are detected, respectively. On the basis of these values of the currents, the microcomputer 3 can determine that the posture of the digital camera 1 is in the vertically framed shooting posture. In this state, by pressing the shutter operation section 36, the user can shoot the image of the subject. The shot image is then recorded on the image recording section 12. In this case, the image recording control section 11 adds a posture determination signal 60 (1) for indicating that the shooting postures of the digital camera 1 has been in the vertically framed shooting posture which is given by rotating the horizontally framed shooting posture by 90 degrees about the optical axis, to the image signal outputted from the buffer memory 9.

Figure 8:
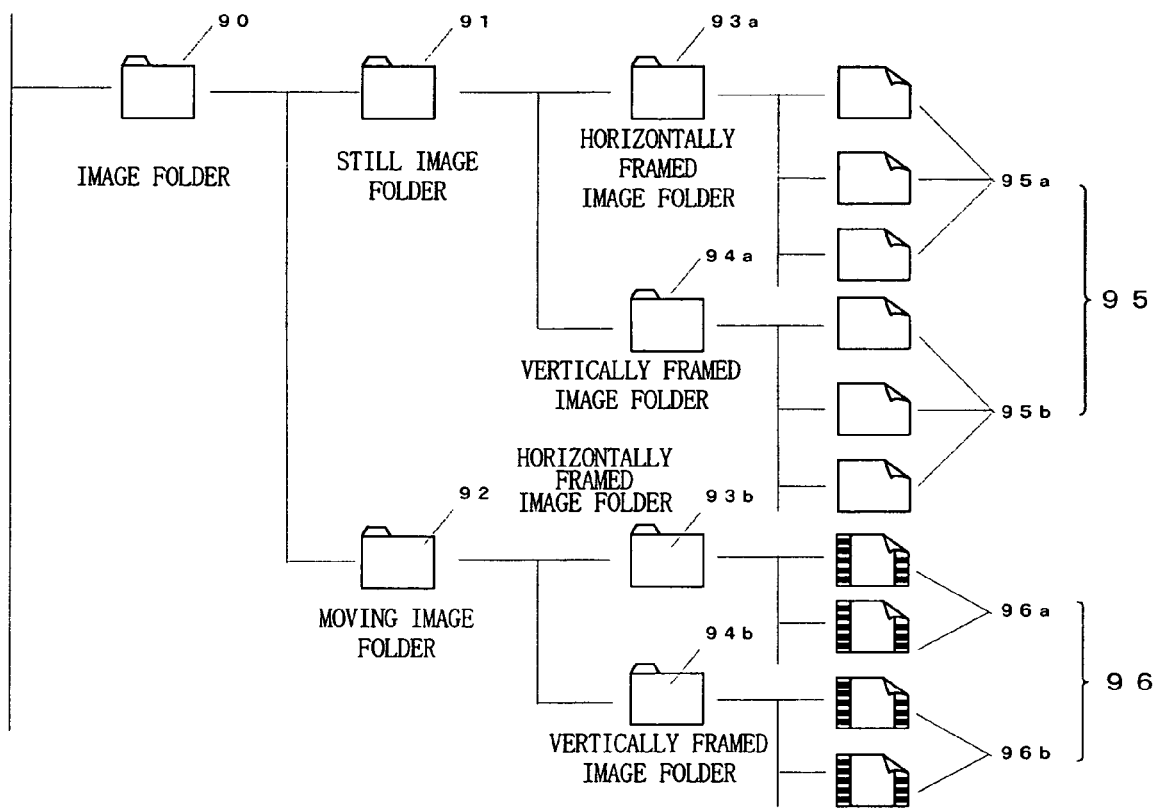
FIG. 8 is a view for explaining a management manner of a taken image file according to the first embodiment.

Next, a management manner of the shot image file will be explained with reference to FIGS. 8 and 9. In FIG. 8, an image folder 90 is formed in the internal memory 50 or the removable memory 51, and a still image folder 91 and a moving image folder 92 are formed in a hierarchy thereunder. Moreover, in hierarchies under respective still image folder 91 and moving image folder 92, horizontally framed image folders 93$a$ and 93$b$ and vertically framed image folders 94$a$ and 94$b$ are formed. Accordingly, after being distributed to respective folders by still image or moving image, shot images are further stored according to the shooting postures in shooting. The still image taken in the still image shooting mode is stored in either the horizontally framed image folder 93$a$ or the vertically framed image folder 94$a$ as a still image file 95. Meanwhile, the moving image taken in a moving image shooting mode is stored in either the horizontally framed image folder 93$b$ or the vertically framed image folder 94$b$ as a moving image file 96.

Figure 9:
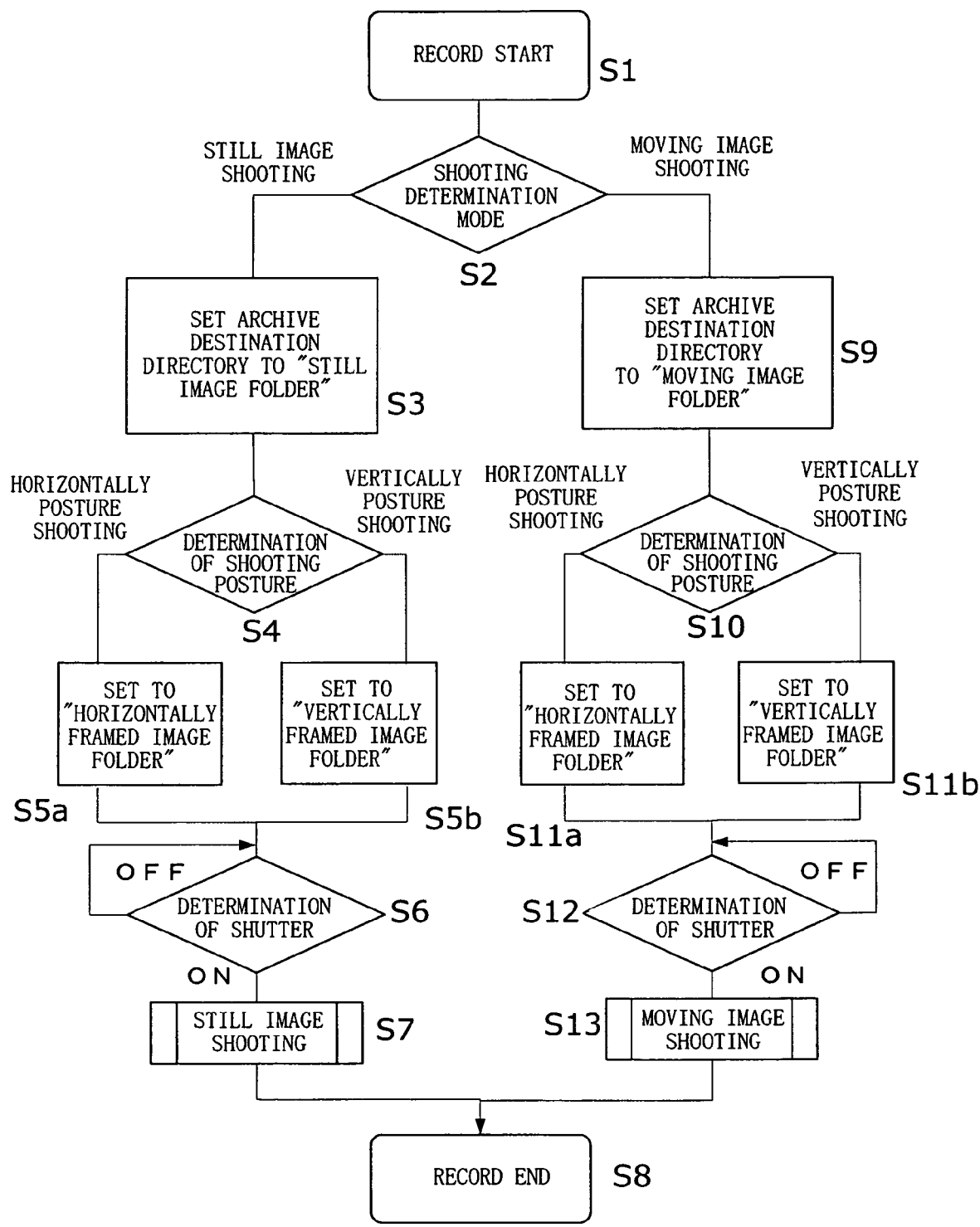
FIG. 9 is a flow chart from a record start to a record end, showing a manner for recording the shot image according to the first embodiment.

FIG. 9 is a flow chart from record start to record end, showing a manner for recording the shot image. First, in order to record the shot image, the user presses the MENU setting operation section 39 to thereby display various menu screens on the display section 55. An image record menu is then selected from the displayed various menu screens. As a result of this, the digital camera 1 moves to an image record mode (Step S1). Next, the microcomputer 3 determines the shooting mode. In other words, the microcomputer 3 determines whether the user selects either the still image shooting mode or the moving image shooting mode (Step S2).

When the user selects the still image shooting mode, the microcomputer 3 sets an archive destination directory of the shot image to the still image folder 91 (Step S3). The posture of the digital camera 1 is determined by a posture detecting section 43 (Step S4). Further, a storing folder of the shot image is set to the horizontally framed image folder 93$a$ in the case of being shot in the horizontally framed shooting posture, while it is set to the vertically framed image folder 94$a$ in the case of being shot in the vertically framed shooting posture (Step S5$a$ and S5$b$). Next, the digital camera waits for the shutter operation section 36 being pressed by the user (Step S6), and when it is pressed, the still image is shot (Step S7), and the record is completed after that (Step S8). In this case, the shot still image is stored as the image files 95$a$ and 95$b$ in the horizontally framed image folder 93$a$ or the vertically framed image folder 94$a$.

Meanwhile, when the user selects the moving image shooting mode, the microcomputer 3 sets the archive destination directory of the shot image to the moving image folder 92 (Step S9). The posture of the digital camera 1 is determined by the posture detecting section 43 (Step S10). Further, the storing folder of the shot image is set to the horizontally framed image folders 93$b$ in the case of being shot in the horizontally framed shooting posture, while it is set to the vertically framed image folder 94$b$ in the case of being shot in the vertically framed shooting posture (Step S11). Next, the digital camera waits for the shutter operation section 36 being pressed (Step S12), and when it is pressed, the moving image is shot (Step S13), and the record is completed after that (Step S8). In this case, the shot moving image is stored as the image files 96$a$ and 96$b$ in the horizontally framed image folders 93$b$ or the vertically framed image folder 94$b$.

Figure 10A:
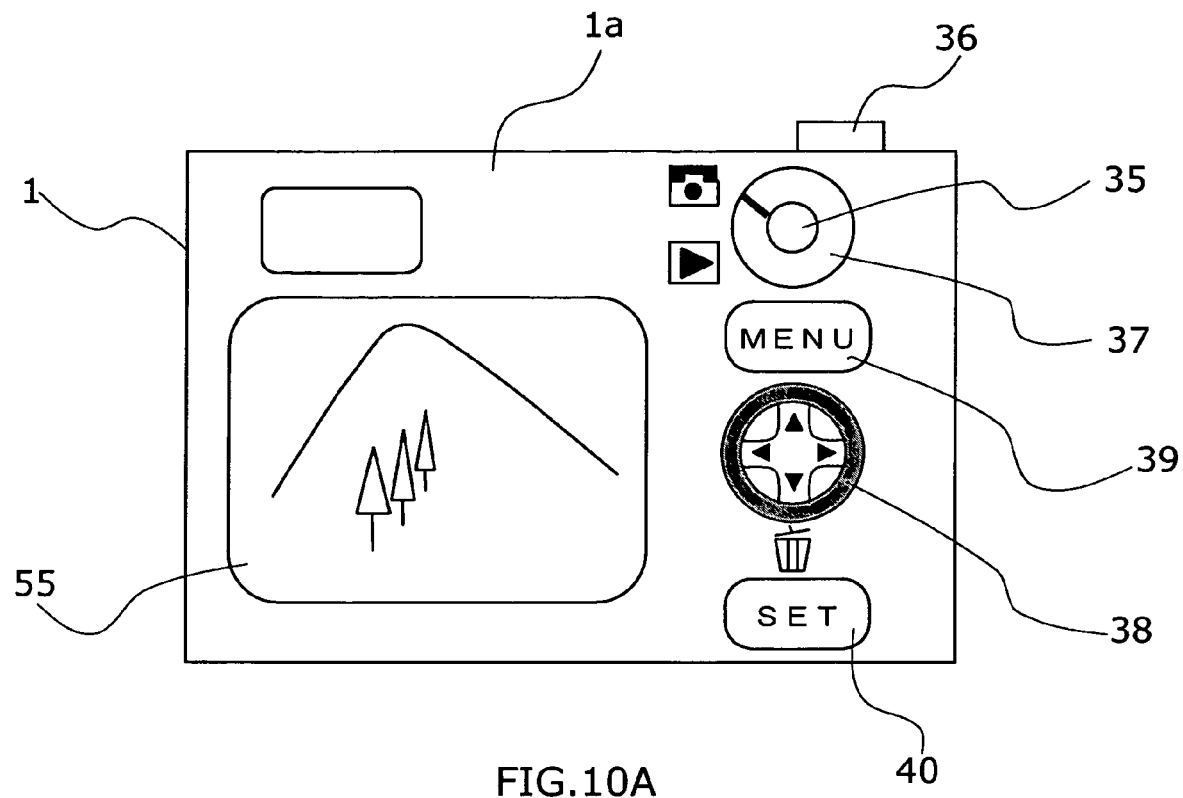
FIG. 10A is a view for explaining a display manner in displaying an image taken in a horizontally framed shooting posture on a display section according to the first embodiment.
Figure 10B:
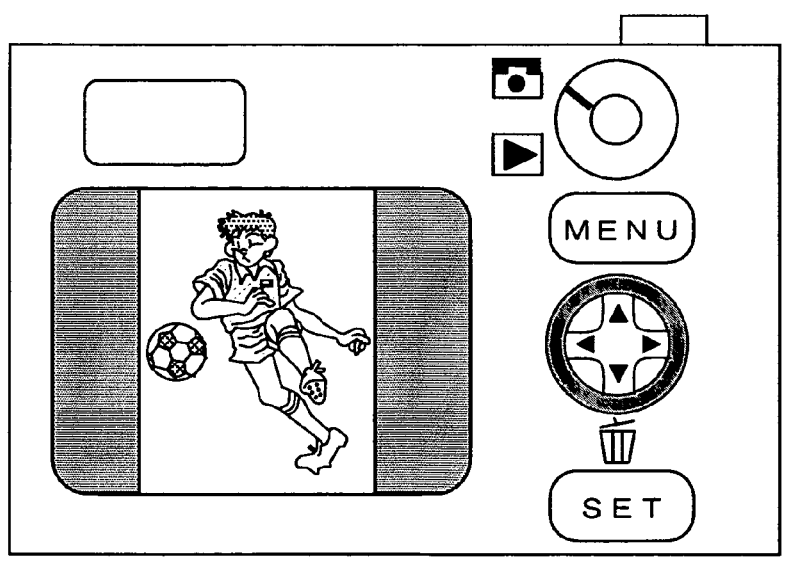
FIG. 10B is a view for explaining a display manner in displaying an image taken in a vertically framed shooting posture on the display section according to the first embodiment.

Next, a display manner when the image taken using the digital camera 1 is displayed on the display section 55 will be explained. In FIGS. 10A and 10B, first, in order to display the shot image on the display section 55, after turning on the power switch 35, the shooting/playback switching operation section 37 is switched to the playback mode. An image is then selected using the cross operation key 38 among the images displayed in a thumbnail form, thus allowing one shot image to be displayed on the display section 55. In this case, in the display manner of the shot image, the image display control section 13 controls the image to be displayed on the basis of the posture determination signal 60 recorded in shooting.

The posture determination signal 60 (0) for indicating the horizontally framed shooting posture in shooting is added to the image taken in the horizontally framed shooting posture. Accordingly, as shown in FIG. 10A, the image display control section 13 reconstructs the posture of the shot image to the same posture in shooting, and displays the reconstructed image on the display section 55.

Meanwhile, the posture determination signal 60 (1) for indicating the vertically framed shooting posture in shooting is added to the image taken in the vertically framed shooting posture. Accordingly, as shown in FIG. 10B, the image display control section 13 reconstructs the posture of the shot image displayed on the display section 55 to a state of being rotated by 90 degrees, namely the same posture in shooting, and displays the reconstructed image on the display section 55.

Figure 11:
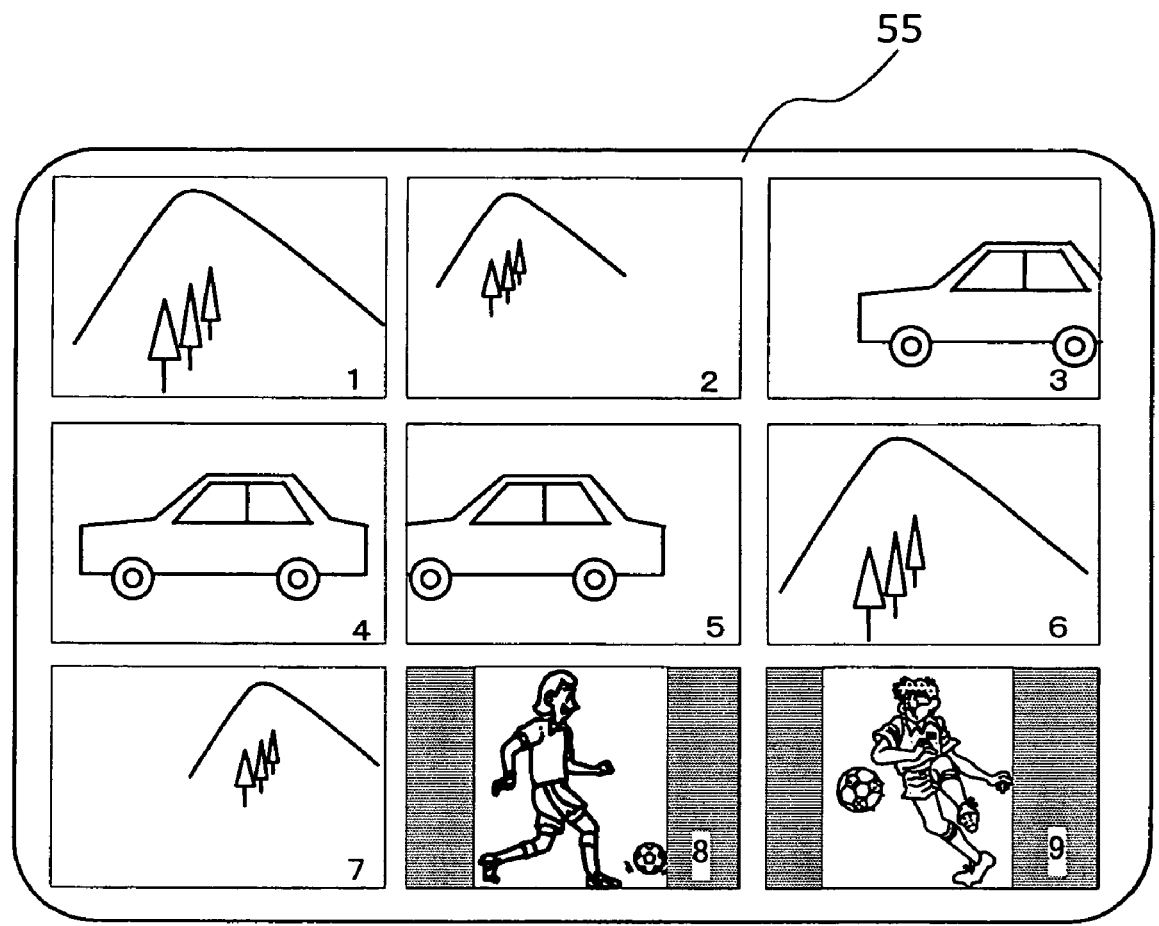
FIG. 11 is a view showing display examples of the display section in displaying the shot image as thumbnail images according to the first embodiment.

FIG. 11 is a view showing display examples of the display section 55 in displaying the shot images in a thumbnail form. Horizontally framed thumbnail images, and vertically framed thumbnail images which are obtained by performing a thin-out processing or the like to the shot images in the horizontally framed shooting posture are recorded with the shot images, respectively. Nine thumbnail images from the first to the ninth are displayed on the display section 55 in a list form. The seven thumbnail images of the first through the seventh are the horizontally framed thumbnail images, and two thumbnail images of the eighth and the ninth are the vertically framed thumbnail images. The horizontally framed images are recorded in the state where the posture determination signal 60 (0) for indicating that the shooting posture is rotated by 0 degree about the optical axis to the horizontally framed shooting posture is added thereto. Accordingly, on the basis of this posture determination signal 60 (0), the horizontally framed thumbnail image is displayed in the state of the horizontally framed shooting posture. Meanwhile, the eighth and ninth vertically framed thumbnail images are recorded in the state where the posture determination signal 60 (1) for indicating that the shooting posture is rotated by 90 degrees about the optical axis to the horizontally framed shooting posture is added thereto. Accordingly, on the basis of this posture determination signal 60 (1), the vertically framed thumbnail image is displayed by being rotated by 90 degrees about the optical axis to the horizontally framed thumbnail image. It would be understood that, by selecting each thumbnail image using the cross operation key 38, these thumbnail images could also be displayed as enlarged images for every shot image.

Figure 12:
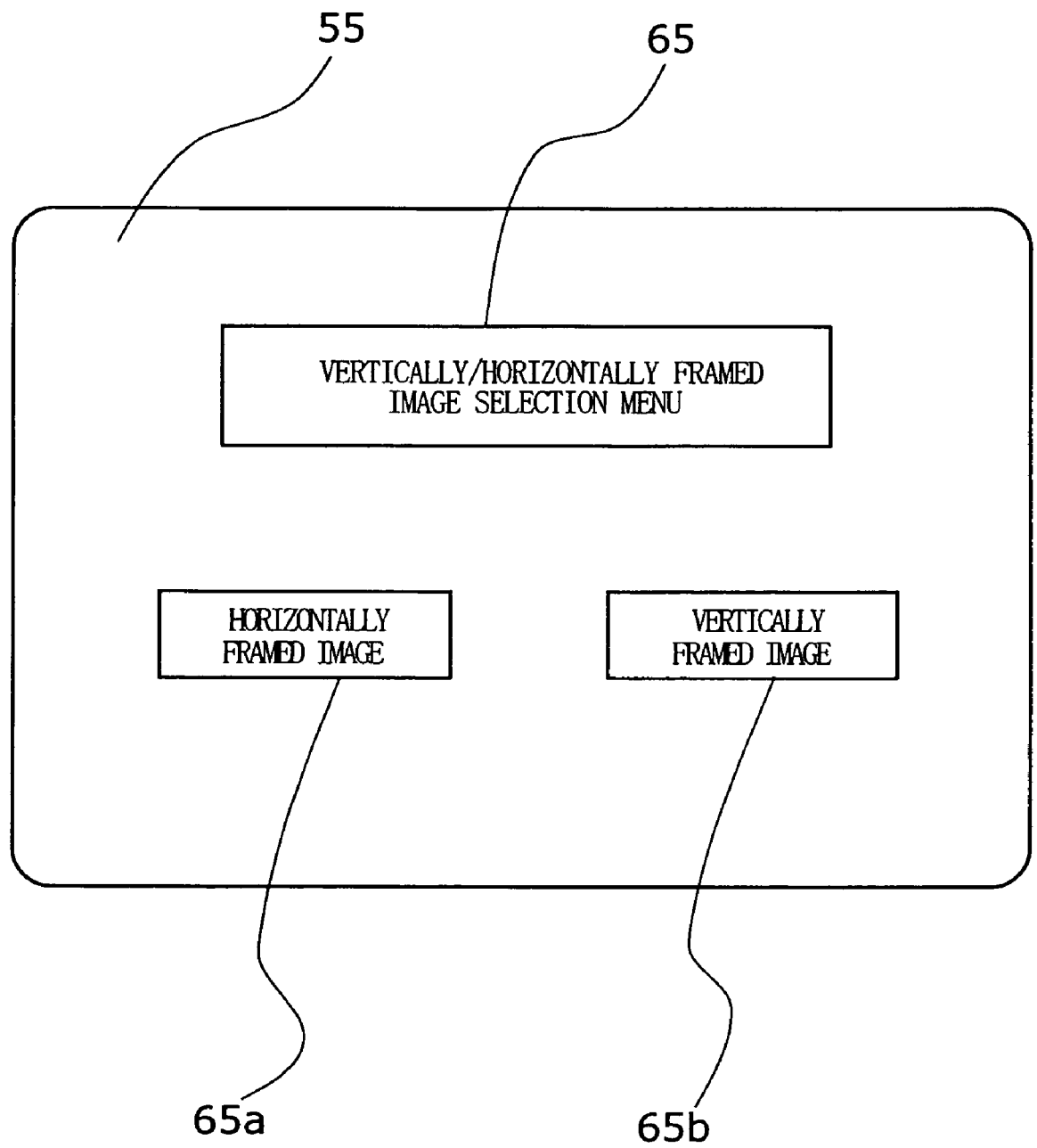
FIG. 12 is a view showing a vertically/horizontally framed image selection menu displayed on the display section according to the first embodiment.
Figure 13A:
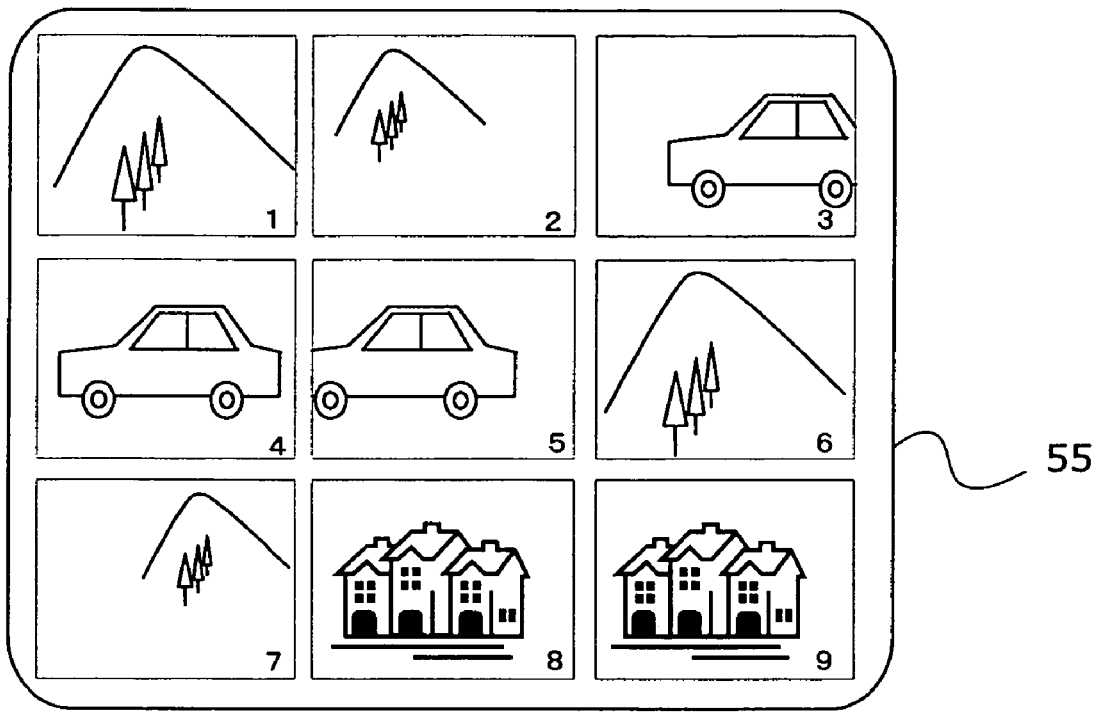
FIG. 13A is a view showing display examples of the display section in displaying only the horizontally framed images as thumbnail images according to the first embodiment.
Figure 13B:
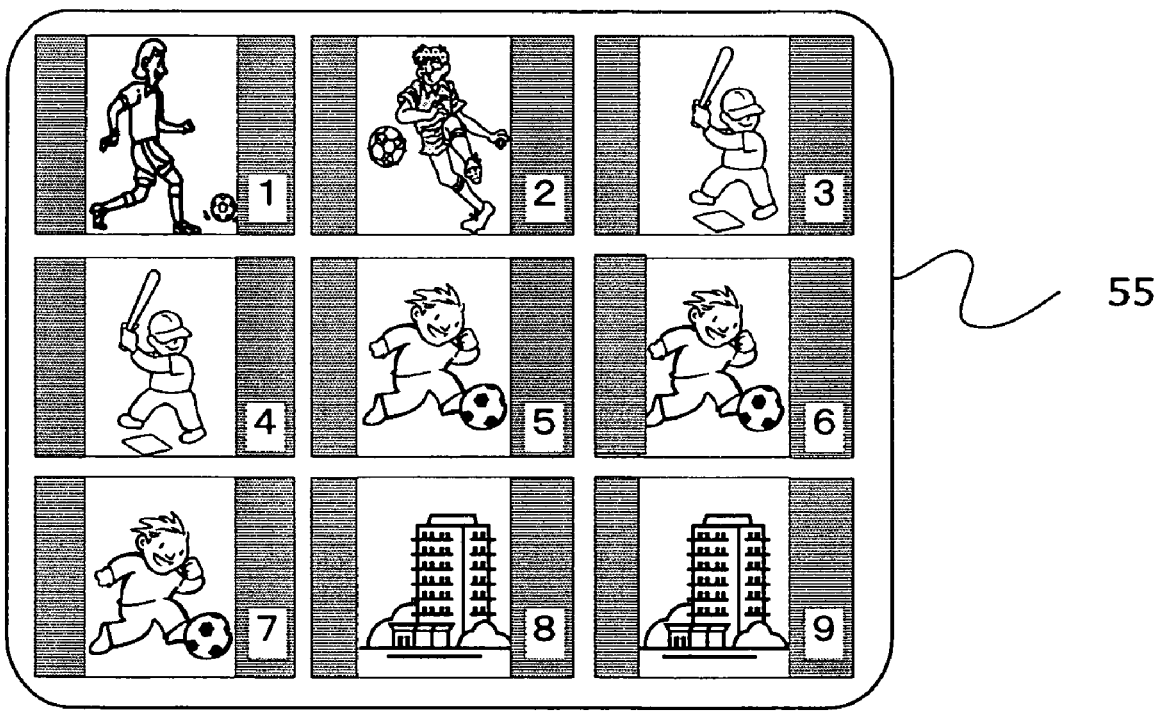
FIG. 13B is a view showing display examples of the display section in displaying only the vertically framed images as thumbnail images according to the first embodiment.

Next, a manner for displaying only the horizontally framed images or only the vertically framed images on the display section 55 in the thumbnail form will be explained with reference to FIGS. 12 and 13. FIG. 12 is a view illustrating a vertically/horizontally framed image selection menu displayed on the display section 55, while FIGS. 13A and 13B show the display examples of the display section 55 when only the horizontally framed images or only the vertically framed images are displayed in the thumbnail form. After switching the shooting/playback switching operation section 37 to the playback mode, the MENU setting operation section 39 is pressed. As a result of this, a vertically/horizontally framed image selection menu 65 is displayed on the display section 55. When only the horizontally framed images are desirably displayed, a horizontally framed image selection button 65a is pushed, so that the microcomputer 3 and the image display control section 13 extract only images in the horizontally framed image folder 93a formed in the hierarchy under the image folder 90, and display the horizontally framed thumbnail images on the display section 55 in the extracted sequence. As a result, as shown in FIG. 13A, only the horizontally framed thumbnail images are displayed on the display section 55.

Meanwhile, when only the vertically framed images are desirably displayed, a vertically framed image selection button 65b is pushed, so that the microcomputer 3 and the image display control section 13 extract only images taken in the vertically framed shooting posture in the vertically framed image folder 94a formed in the hierarchy under the shot image folder 90, and display the vertically framed thumbnail images on the display section 55 in the extracted sequence. As a result, as shown in FIG. 13B, only the vertically framed thumbnail images are displayed on the display section 55.

As will be understood, the digital camera 1 stores the shot images in the folders classified by the shooting posture according to the shooting postures. As a result of this, only the horizontally framed images or only the vertically framed images can be easily extracted, and only the thumbnail images of the same shooting posture can be displayed on the display section 55.

As described above, by using the digital camera according to the first embodiment, the shooting posture of the digital camera 1 is detected by the image blur compensation mechanism. The posture determination signals according to the postures are recorded with the shot images, so that the shot images can be separately recorded according to the shooting postures. In addition, at the time of playback of the shot image, owing to providing a vertically/horizontally framed image selection unit, the shot images are extracted according to the shooting postures. Moreover, only the images with the same shooting posture can be displayed on the display section. That makes it possible to provide the thumbnail display comfortable to the user without mixing the portrait and horizontally framed images.

Incidentally, in this embodiment, when the posture detection of the digital camera is performed using the image blur compensation mechanism, the current supplied to the coil of the yawing direction and the current supplied to the coil of the pitching direction may be equal depending on the posture of the digital camera. For example, they are the case where the user shoots the image in a posture in which the optical axis direction of the digital camera and the gravity direction are in parallel, the case where in a posture in which the optical axis direction of the digital camera is perpendicular to the gravity direction, the user shoots the image by rotating the digital camera about the optical axis by a predetermined range, or the like. As will be understood, when the posture detection is not performed by the image blur compensation mechanism, "0" of the posture determination signal may be added to the shot image as the image is shot in the horizontally framed shooting posture. Meanwhile, owing to the setting of the user, "1" of the posture determination signal may be added to the shot image as the image is shot in the vertically framed shooting posture.

Incidentally, in this embodiment, the shooting posture is determined by detecting the current value of both of the pitching and yawing current value detecting sections, but the shooting posture can be determined by detecting at least either one of the current values. As explained in this embodiment, however, if abnormalities occur in either one of the current detecting sections of the pitching and yawing current value detecting sections, by detecting both current values, the shooting posture can be determined more accurately.

Incidentally, in this embodiment, the shooting posture is determined by detecting the current values of the pitching and yawing current value detecting sections, but it is not limited to this. For example, the same effect can be obtained even when voltage values are measured.

Second Embodiment

Figure 14A:
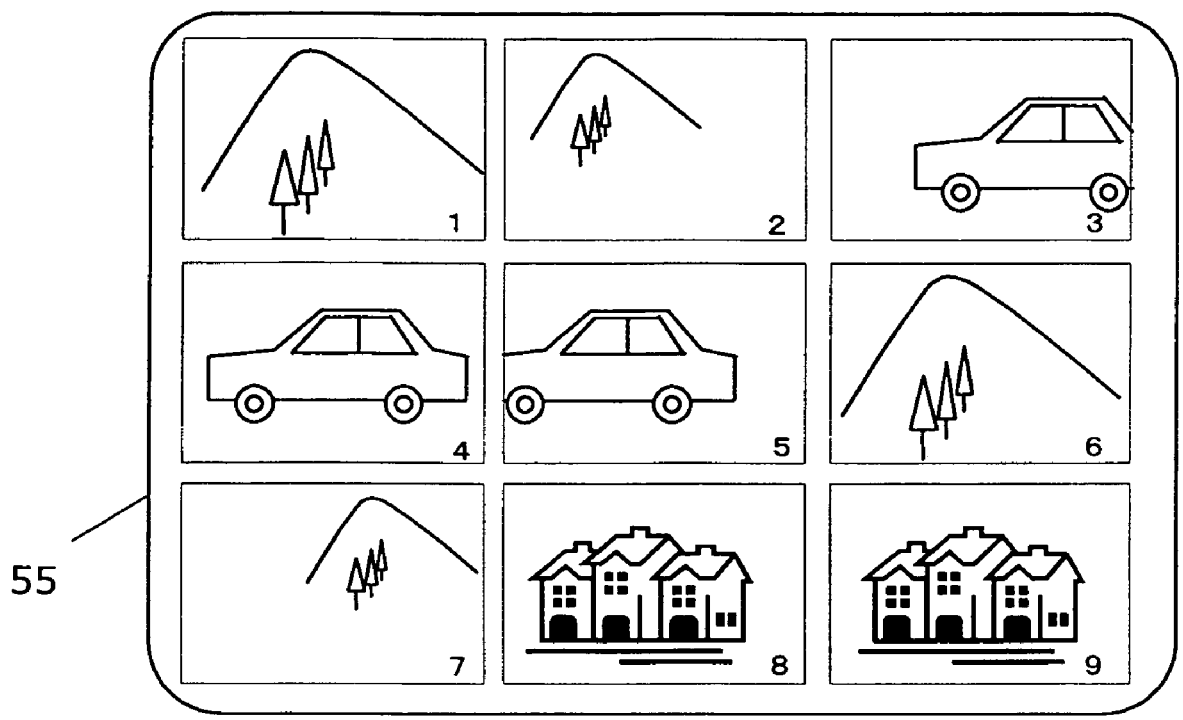
FIG. 14A is a view showing display examples of the display section on which the thumbnail images are displayed according to a second embodiment.
Figure 14B:
FIG. 14B is a view showing display examples of the display section on which the thumbnail images are displayed according to the second embodiment.

FIGS. 14A and 14B show display examples of the display section 55 on which thumbnail images are displayed in a second embodiment. An imaging device according to this embodiment has a configuration almost the same as that of the digital camera 1 according to the first embodiment. Accordingly, in the second embodiment, the points which are different from the first embodiment will be explained.

As shown in FIG. 14A, when the images taken in the horizontally framed shooting posture are displayed in the thumbnail form, nine thumbnail images are displayed on the display section 55 in a list form. Meanwhile, as shown in FIG. 14B, when the images taken in the vertically framed shooting posture are displayed in the thumbnail form, six thumbnail images are displayed on the display section 55 in a list form. Accordingly, in the longitudinal direction of the display section 55, three horizontally framed thumbnail images will be displayed in the cross section, while two vertically framed thumbnail images will be displayed. Incidentally, in the horizontal direction of the display section 55, three thumbnail images are displayed in both cases of the horizontally framed image and the vertically framed image. As will be understood, the displayed number of vertically framed thumbnail images displayed on the display section 55 is fewer than that of horizontally framed thumbnail images. That makes it possible to largely display the vertically framed thumbnail images as compared with displaying the conventional vertically framed thumbnail images in size. In addition, owing to largely displaying thumbnail images, black belts displayed on right and left sides of each thumbnail image can be removed, thereby making it possible to provide a comfortable thumbnail display with excellent visibility.

Next, a manner of displaying the shot images in the thumbnail form according to this embodiment will be explained. First, after switching the shooting/playback switching operation section 37 of the digital camera 1 to the playback mode, the MENU setting operation section 39 is pressed. As a result of this, as shown in FIG. 12, the vertically/horizontally framed image extract menu 65 is displayed on the display section 55. When only the horizontally framed images are desirably displayed, the horizontally framed image selection button 65a is selected. As a result of this, the microcomputer 3 and the image display control section 13 extract the images in the horizontally framed image folder 93a formed in the hierarchy under the shot image folder 90, and display each thumbnail image on the display section 55 in the extracted sequence. In this case, the image display control section 13 controls so that nine thumbnail images may be displayed on the display section 55 in a list form.

Meanwhile, when only the vertically framed images are desirably displayed, the vertically framed image selection button 65b is selected. As a result of this, the microcomputer 3 and the image display control section 13 extract the images in the vertically framed image folder 94a formed in the hierarchy under the shot image folder 90, and display each thumbnail image on the display section 55 in the extracted sequence. In this case, the image display control section 13 controls so that six thumbnail images may be displayed on the display section 55 in a list form.

As described above, according to this embodiment, in addition to the effect described in the first embodiment, when the images taken in the vertically framed shooting posture are displayed in the thumbnail form, owing to the control of the image display control section 13, the displayed number of thumbnail images displayed on the display section 55 is displayed fewer as compared with that of thumbnail images of the images taken in the horizontally framed shooting posture. Accordingly, that makes it possible to provide a comfortable thumbnail display.

Figure 15:
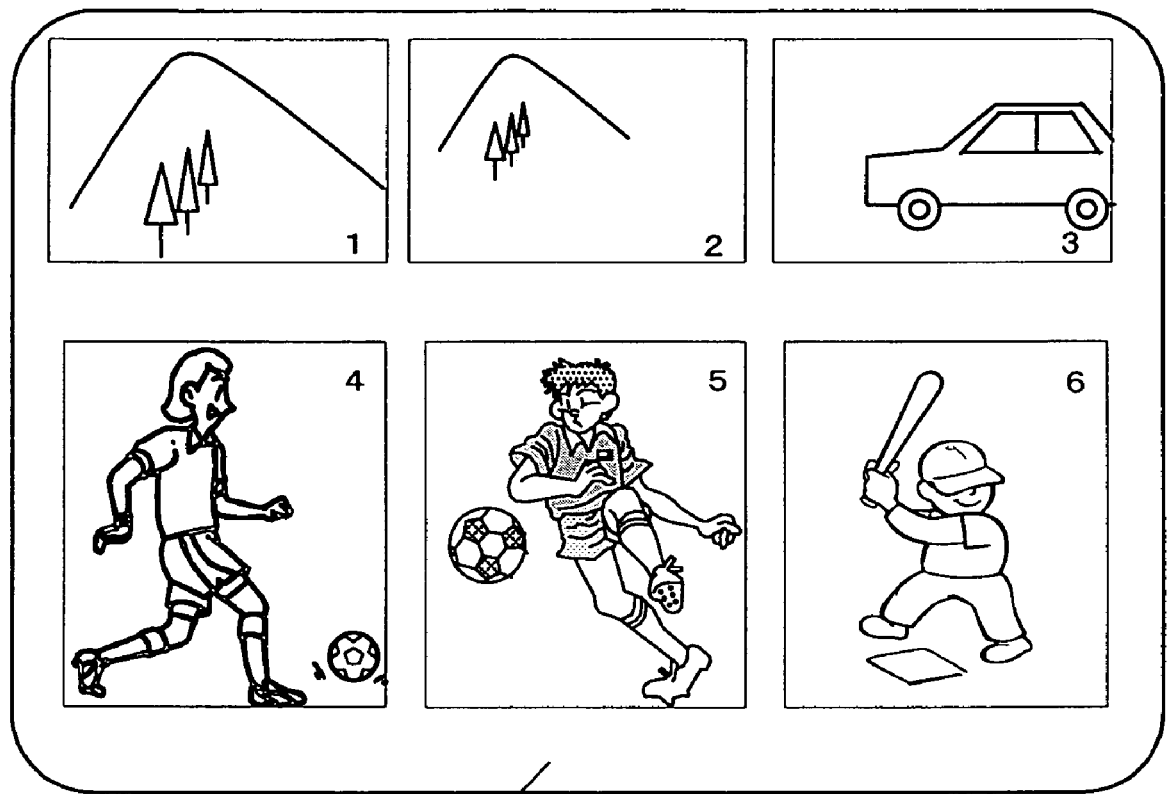
FIG. 15 is a view showing display example of the display section when the vertically and horizontally framed thumbnail images are mixedly present according to the second embodiment.

In addition, even when the portrait and horizontally framed thumbnail images are mixedly displayed, as shown in FIG. 15, the range for the vertically framed image to be displayed in the horizontal direction may be enlarged up to approximately the same size as that of the horizontally framed image. Moreover, a display size of the vertically framed thumbnail image can be enlarged to that of the horizontally framed thumbnail image, thereby making it possible to provide a comfortable thumbnail display with excellent visibility.

Third Embodiment

Figure 16:
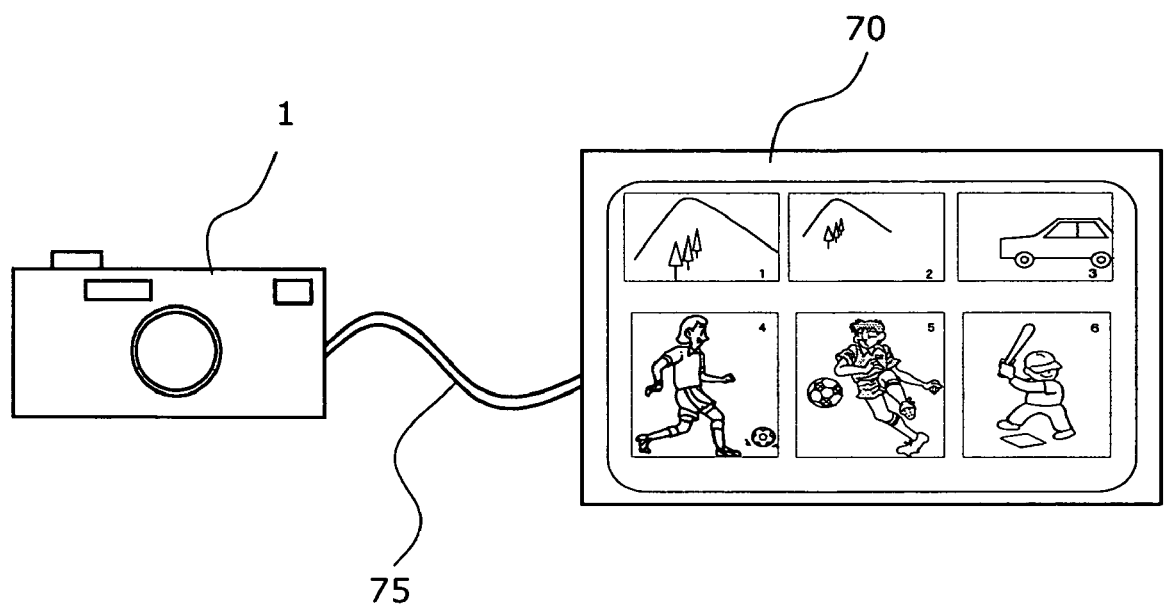
FIG. 16 is a view showing an imaging device and a display apparatus according to a third embodiment.

FIG. 16 is a view showing an imaging device and a display apparatus according to a third embodiment. A digital camera according to this embodiment has almost the same configuration as that of the first and the second embodiments, but is different in that, on the basis of posture information in shooting, the shot image and the reduced image are displayed on an external display apparatus connected to the imaging device. As shown in FIG. 16, the shot image recorded on the image recording section of the digital camera 1 with the posture information is displayed on a display apparatus 70, such as a television monitor or the like via a cable 75. As the cable 75, for example a USB (Universal Serial Bus) cable may be used. Since the image displayed on the display apparatus 70 is controlled by the image display control section 13 of the digital camera 1, in a manner similar to that of the first and the second embodiments, the images obtained by reconstructing the posture in shooting and the thumbnail images thereof may be displayed on the external display apparatus.

According to the configuration described above, when the display section is not provided in the digital camera, and/or when the display size of the shot image is desired to be enlarged, by operating the digital camera 1, in a manner similar to that of the first and the second embodiments, the image obtained by reconstructing the posture in shooting can be displayed on an external television monitor or the like, thereby making it possible to achieve a comfortable thumbnail display with excellent visibility, and allowing the imaging device and the display apparatus with high convenience to be provided.

It would be understood that, in this embodiment, the example of using the television monitor as the external display apparatus is described, but it is not limited to this. For example, it may be configured in such a way that the digital camera is connected to a personal computer connected to the monitor via the cable.

It would be understood that, in this embodiment, the example of using the USB cable as the cable 75 is described, but it is not limited to this. For example, a cable for IEEE 1394 serial buses, and a radio such as wireless LAN or the like may be used for its connection.

Fourth Embodiment

Figure 17:
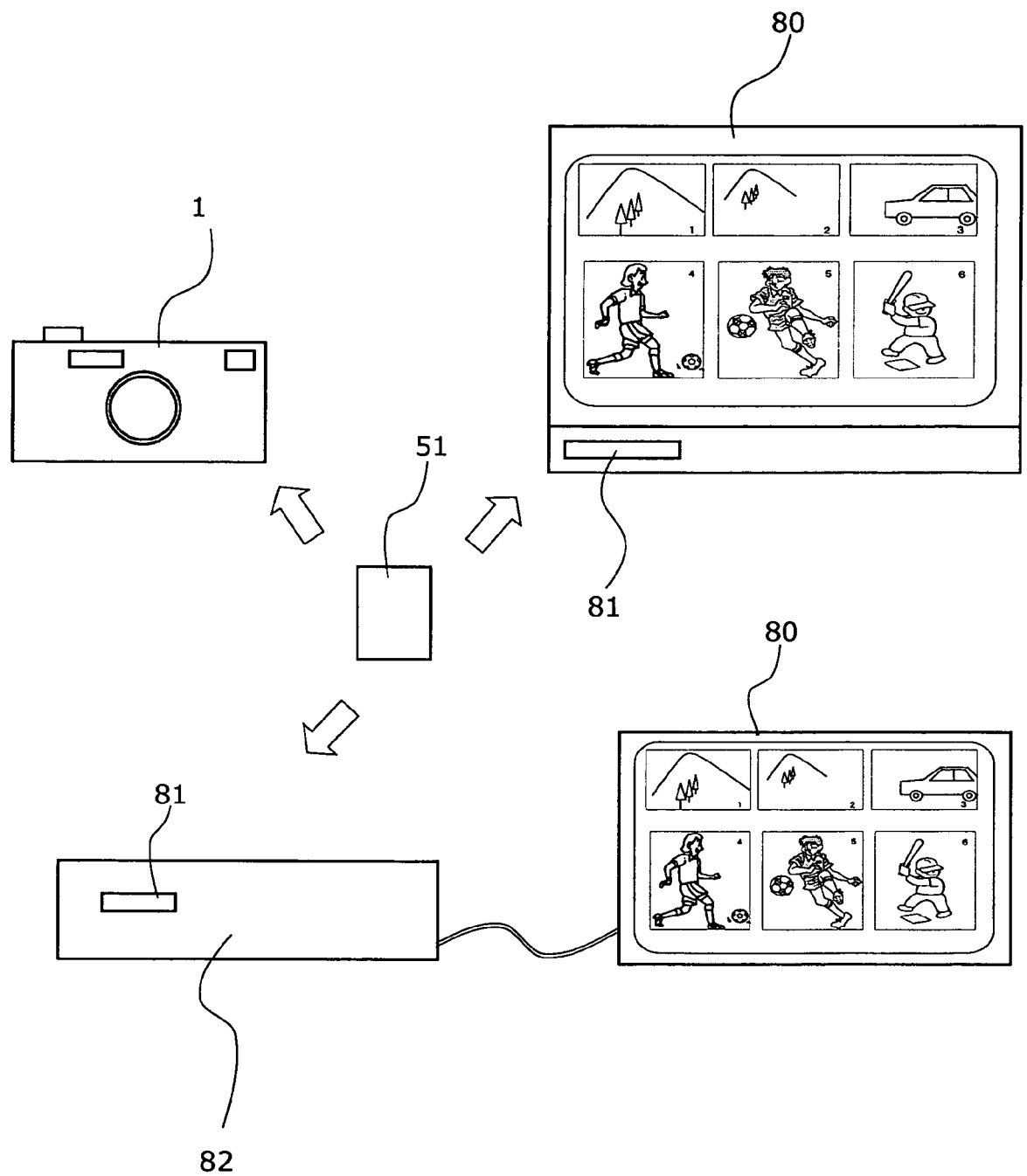
FIG. 17 is a view showing a relationship between a posture of the digital camera and a posture of the shot image displayed on the display section.
Figure 19:
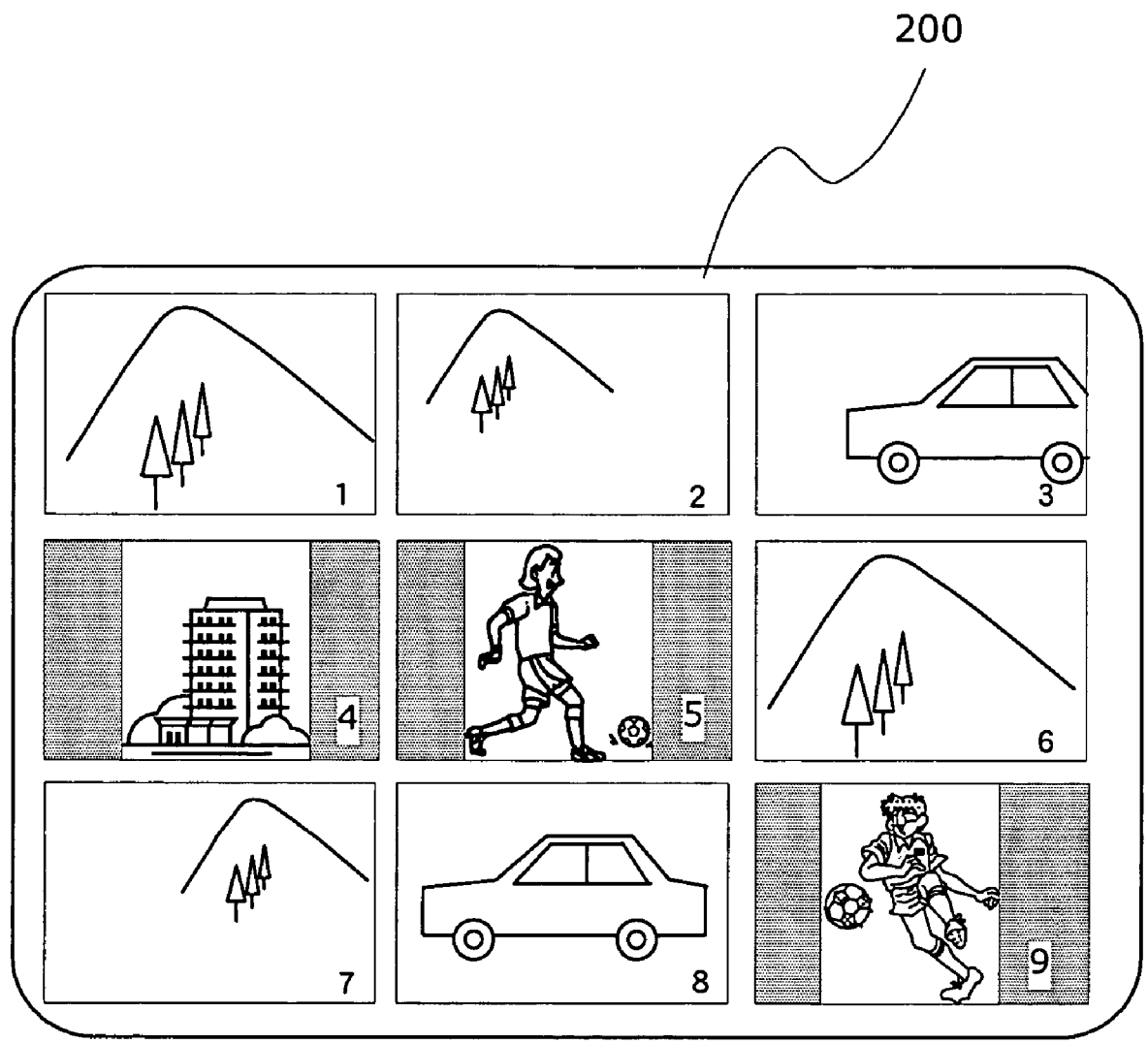
FIG. 19 is a view showing display examples of the display section when the vertically and horizontally framed thumbnail images are mixedly present.

FIG. 17 is a view showing a display controller according to a fourth embodiment. A digital camera according to this embodiment has almost the same configuration as that of the first and the second embodiments, but is different in that the display control performed by the digital camera in the first and the second embodiments is performed by a display controller 82. The display controller 82 includes, for example a personal computer, a monitor, or the like provided with image processing software. The image taken by the digital camera 1 is recorded with the reduced image and the posture information on the removable memory 51, such as a attachable and detachable memory card. The removable memory 51 is not limited to the memory card, but may be a hard disk, an optical disk, or the like. The shot image is displayed on a display apparatus 80 provided with a removable memory insertion unit 81 which can read the image data from the removable memory 51, and a display controller. On the basis of the posture information recorded on the removable memory 51, a display control. is performed to the image displayed on the display apparatus by the display controller in a manner similar to that of the first and the second embodiments.

According to the above configuration, the display controller 82 according to this embodiment can read the shot image, the reduced image, and the posture information obtained by the digital camera 1 from the removable memory 51 which records those images and information, and on the basis of the posture information, can display the images obtained by reconstructing the posture in shooting and the thumbnail images thereof described in the first and the second embodiments on the display apparatus.

It would be understood that the example of using the personal computer as the display apparatus provided with the display controller is described, but it is not limited to this. For example, as shown in FIG. 17, those images may be displayed on the television monitor via a hard disk recorder or a DVD recorder, or the like, which can read the image data from the removable memory 51.

It would be understood that, in this embodiment, the example of using the display apparatus provided with the removable memory insertion unit 81 and the display controller is described, but it is not limited to this. For example, it may be configured in such a way that a readers, such as a memory card reader which can read the image data from the removable memory 51, the display controller, and the display apparatus are connected.

It would be understood that, in the first to the third embodiment, the example of using the reduced image for the thumbnail display is described, it is not limited to this. For example, the reduced image may be used for split screens, such as two split screens or three split screens obtained by splitting the screen of the display section, and that makes it possible to provide a comfortable reduced image display and the split screen display in a manner similar to that of the thumbnail display.

It would be understood that, in the first to the third embodiment, as the posture detector, the example of using the image blur compensation mechanism is described, but it is not limited to this. For example, by attaching an angle sensor, a rotation sensing device, or the like to the digital camera, the posture may be detected.

It would be understood that, in the first to the third embodiment, the imaging device provided with one shutter operation section is used, but it is not limited to this. For example, a shutter operation section for shooting the image in the horizontally framed shooting posture and a shutter operation section for shooting the image in the vertically framed shooting posture may be independently mounted, respectively, and by using the shutter operation sections, the shooting posture may be determined.

It would be understood that, in the first to the third embodiment, the case where the shot image is the still image is described, but a moving image or a simple moving image may also provide a similar effect.

It would be understood that, in the first to the third embodiment, as for the shooting posture, the angle in the case of the horizontally framed shooting posture is assumed to be 0 degree, and the posture obtained by rotating the horizontally framed shooting posture by 90 degrees about the optical axis is defined as the vertically framed shooting posture, but a posture rotated by −90 degrees may also provide a similar effect. Moreover, a posture determination signal of the posture rotated by −90 degrees is defined as (2) and is added thereto, so that total three postures, namely one landscape posture and two portrait postures, may be detected.

It would be understood that, in the first to the third embodiment, a manner of adding the signal of (0) or (1) to the shot image as the posture determination signal, but it is not limited to this. In addition, the present invention is not limited to a manner of recording the posture determination signal on the shot image, but may use a method of storing the posture determination signal in a file different from that of the shot image, and associating the shot image with the file in which the posture determination signal is stored.

It would be understood that, in the third to the fourth embodiment, the form of displaying the shot image on the external display apparatus is employed, but it is not limited to this. For example, a form of connecting to a printer, such as a printer or the like may provide a similar effect.

The imaging device, the display controller, and the display apparatus according to the present invention are suitable for a digital still camera, a digital video camera, a cellular phone terminal and a PDA provide with a camera function, and further a DVD recorder, a hard disk recorder, or the like, to which a comfortable display is desired from the viewpoint of the display manner of the shot image.

While the present invention has been shown and described in detail, the foregoing description is in all aspects illustrative and not restrictive. It is therefore understood that numerous other modifications and variations can be devised without departing from the scope of the invention.

What is claimed is:

1. An imaging device for producing an electrical image signal obtained by converting an optical image of a subject, the imaging device comprising:
    a display unit for displaying an image on the basis of said image signal;
    an imaging optical system for forming the optical image of the subject;
    an imaging unit for receiving the optical image formed by said imaging optical system to convert the optical image into the electrical image signal;
    a posture detector for detecting a posture of said imaging device in shooting;
    a recording unit for recording a reduced image of the shot image obtained by said imaging unit, and posture information on the posture of said imaging device, the posture being detected by said posture detector and corresponding to the reduced image;
    an image extracting unit for extracting reduced images recorded on said recording unit; and
    an image display controller for reconstructing, on the basis of said posture information, a horizontal and vertical direction of said reduced images extracted by said image extracting unit to said posture of said imaging device in shooting, and for causing said display unit to display said reconstructed reduced images,
    wherein, in the case where a direction along a short side of said display unit is defined as a first direction and a direction along a long side of said display unit is defined as a second direction, said image display controller controls said display unit such that:
    a dimension in the first direction of a reduced image, whose dimension in the first direction is larger than a dimension in a second direction, is larger than a dimension in the first direction of a reduced image whose dimension in the first direction is smaller than a dimension in the second direction, and a dimension in the second direction of the reduced image, whose dimension in the first direction is larger than the dimension in the second direction, is different from the dimension in the first direction of the reduced image whose dimension in the first direction is smaller than a dimension in the second direction.

2. The imaging device according to claim 1, wherein said image display controller controls, based on said posture information, the maximum number of reduced images displayed by said display unit.

3. The imaging device according to claim 1, further comprising a record controller for storing said reduced image including the same posture information in the same folder of said recording unit.

4. The imaging device according to claim 1, further comprising an image blur compensation unit for detecting a vibration applied to said imaging device to thereby drive a compensation lens of said imaging optical system in two directions perpendicular to an optical axis,
wherein said posture detector determines the posture of said imaging device by detecting a signal for driving said compensation lens.

5. The imaging device according to claim 4, wherein
said image blur compensation unit includes first and second actuators for driving said compensation lens in two directions perpendicular to the optical axis, and
said posture detector determines the posture of said imaging device by detecting a driving current value of at least either of said first and second actuators.

6. An imaging device that produces an electrical image signal obtained by converting an optical image of a subject, and is connectable to a display unit, the imaging device comprising:
an imaging optical system for forming the optical image of the subject;
an imaging unit for receiving the optical image formed by said imaging optical system to convert the optical image into the electrical image signal;
a posture detector for detecting a posture of said imaging device in shooting;
a recording unit for recording a reduced image of the shot image obtained by said imaging unit, and posture information on the posture of said imaging device, the posture being detected by said posture detector and corresponding to the reduced image;
an image extracting unit for extracting reduced images on said recording unit;
an image display controller for generating a control signal to reconstruct, on the basis of said posture information, a horizontal and vertical direction of said reduced images extracted by said image extracting unit to said posture of said imaging device in shooting, and cause said display unit to display unit to display said reconstructed reduced images; and
an output unit for supplying said control signal and said reduced image to said display unit,
wherein, in the case direction along a short side of said display unit is defined as a first direction and a direction along a long side of said display unit is defined as a second direction, said image display controller controls said display unit such that:
a dimension in the first direction of a reduced image, whose dimension in the first direction is larger than a dimension in a second direction, is larger than a dimension in the first direction of a reduced image whose dimension in the first direction is smaller than a dimension in the second direction, and a dimension in the second direction of the reduced image, whose dimension in the first direction is larger than the dimension in the second direction, is different from the dimension in the first direction of the reduced image whose dimension in the first direction is smaller than a dimension in the second direction.

7. The imaging device according to claim 6, wherein said image display controller controls, based on said posture information, the maximum number of reduced images displayed by said display unit.

8. The imaging device according to claim 6, further comprising a record controller for storing said reduced image including the same posture information in the same folder of said recording unit.

9. The imaging device according to claim 6, further comprising an image blur compensation unit for detecting a vibration applied to said imaging device to thereby drive a compensation lens of said imaging optical system in two directions perpendicular to an optical axis,
wherein said posture detector determines the posture of said imaging device by detecting a signal for driving said compensation lens.

10. The imaging device according to claim 9, wherein
said image blur compensation unit includes first and second actuators for driving said compensation lens in two directions perpendicular to the optical axis, and
said posture detector determines the posture of said imaging device by detecting a driving current value of at least either of said first and second actuators.

11. A display apparatus for reading a reduced image of a shot image, and posture information on a posture of an imaging device corresponding to said reduced image recorded on a recording unit to thereby display said reduced image, the display apparatus comprising:
a read unit for reading said reduced image, and said posture information corresponding to said reduced image recorded on a recording unit;
an image extracting unit for extracting reduced images read by said read unit; and
an image display controller for reconstructing, on the basis of the posture information, a horizontal and vertical direction of said reduced images extracted by said image extracting unit to said posture of said imaging device in shooting, and causing said reconstructed reduced images to be displayed by said display apparatus,
wherein, in the case where a direction along a short side of said display apparatus is defined as a first direction and a direction along a long side of said display apparatus is defined as a second direction, said image display controller controls said display apparatus such that:
a dimension in the first direction of a reduced image, whose dimension in the first direction is larger than a dimension in a second direction, is larger than a dimension in the first direction of a reduced image whose dimension in the first direction is smaller than a dimension in the second direction, and a dimension in the second direction of the reduced image, whose dimension in the first direction is larger than the dimension in the second direction, is different from the dimension in the first direction of the reduced image whose dimension in the direction is smaller than a dimension in the second direction.

12. The display apparatus according to claim 11, wherein said image display controller controls, based on said posture information, the maximum number of reduced images displayed by said display apparatus.

13. A display controller connectable to a display unit, the display controller comprising:

a read unit for reading a reduced image of a shot image, and posture information on a posture of an imaging device corresponding to said reduced image recorded on a recording unit;

an image extracting unit for extracting reduced images read by said read unit;

an image display controller for generating a control signal to reconstruct, on the basis of said posture information, a horizontal and vertical direction of said reduced images extracted by said image extracting unit to said posture of said imaging device in shooting, and cause said display unit to display said reconstructed reduced images; and an output unit for supplying said control signal and said reduced image to said display unit, wherein, in the case where a direction along a short side of said display unit is defined as a first direction and a direction along a long side of said display unit is defined as a second direction, said image display controller controls said display unit such that:

a dimension in the first direction of a reduced image, whose dimension in the first direction is larger than a dimension in a second direction, is larger than a dimension in the first direction of a reduced image whose dimension in the first direction is smaller than a dimension in the second direction, and a dimension in the second direction of the reduced image, whose dimension in the first direction is larger than the dimension in the second direction, is different from the dimension is the first direction of the reduced image whose dimension in the first direction is smaller than a dimension in the second direction.

14. The display controller according to claim 13, wherein said control signal includes a signal capable of controlling, based on said posture information, the maximum number of reduced images displayed by said display unit.

15. A display controller connectable to a read unit for reading a reduced image of a shot image, and posture information on a posture of an imaging device corresponding to said reduced image recorded on a recording unit, and a display unit, the display controller comprising:

an image extracting unit for extracting reduced images read by said read unit;

an image display controller for generating a control signal to reconstruct, on the basis of said posture information, a horizontal and vertical direction of said reduced images extracted by said image extracting unit to said posture of said imaging device in shooting, and cause said display unit to display said reconstructed reduced images; and an output unit for supplying said control signal and said reduced image to said display unit, wherein, in the case where a direction along a short side of said display unit is defined as a first direction and a direction along a long side of said display unit is defined as a second direction, said image display controller controls said display unit such that:

a dimension in the first direction of a reduced image, whose dimension in the first direction is larger than a dimension in a second direction, is larger than a dimension in the first direction of a reduced image whose dimension in the first direction is smaller than a dimension in the second direction, and a dimension in the second direction of the reduced image, whose dimension in the first direction is larger than the dimension in the second direction, is different from the dimension in the first direction of the reduced image whose dimension in the first direction is smaller than a dimension in the second direction.

16. The display controller according to claim 15, wherein said control signal includes a signal capable of controlling, on said posture information, the maximum number of reduced images displayed by said display unit.

\* \* \* \* \*